US012480801B2

(12) United States Patent
Spencer et al.

(10) Patent No.: US 12,480,801 B2
(45) Date of Patent: Nov. 25, 2025

(54) INDIRECT WEIGHT MEASUREMENT SYSTEMS AND PROCESSES

(71) Applicant: Scalable Systems Group, Inc., Roanoke, VA (US)

(72) Inventors: Thomas Lee Spencer, Atlanta, GA (US); William Adams Clark, Jr., Columbus, GA (US); Mark Stephen Lucas, Roanoke, VA (US); Jay Robert Brenner, Atlanta, GA (US)

(73) Assignee: Scalable Systems Group, Inc., Roanoke, VA (US)

( * ) Notice: Subject to any disclaimer, the term of this patent is extended or adjusted under 35 U.S.C. 154(b) by 149 days.

(21) Appl. No.: 17/986,627

(22) Filed: Nov. 14, 2022

(65) Prior Publication Data
US 2023/0073987 A1 Mar. 9, 2023

Related U.S. Application Data

(63) Continuation of application No. PCT/US2021/032572, filed on May 14, 2021.
(Continued)

(51) Int. Cl.
*G01G 3/06* (2006.01)
*G01C 9/00* (2006.01)
*G01G 19/02* (2006.01)

(52) U.S. Cl.
CPC ............ *G01G 3/06* (2013.01); *G01C 9/00* (2013.01); *G01G 19/028* (2013.01)

(58) Field of Classification Search
CPC .......... G01G 3/06; G01G 3/12; G01G 23/002; G01C 9/00
See application file for complete search history.

(56) References Cited

U.S. PATENT DOCUMENTS

| 4,679,643 A | 7/1987 | Bové |
| 4,951,764 A | 8/1990 | Brand |

(Continued)

FOREIGN PATENT DOCUMENTS

KR 2009-0073976 A 7/2009

OTHER PUBLICATIONS

Applicant: Wastewizer, LLC. Notification of Transmittal of the International Search Report and the Written Opinion of the International Searching Authority, or the Declaration. International Application No. PCT/US2021/032572. International Filing Date: May 14, 2021. Mail Date: Aug. 17, 2021.

(Continued)

*Primary Examiner* — Natalie Huls
(74) *Attorney, Agent, or Firm* — Bradley Arant Boult Cummings LLP; Daniel E. Sineway, Esq.

(57) ABSTRACT

According to one aspect, this disclosure describes a novel indirect weight sensing device, systems, and related processes. In at least one embodiment, the present systems include one or more springs with known properties, at least one metal plate on which the springs are fastened and through which the container load is transferred from the container to the ground, a spring deformation sensor by which spring deformation is reckoned, a digital level by which general orientation of the upper plate is determined relative to the ground, a computing unit to collect and process data from the spring deformation sensor and digital level, and an antenna or other such hardware to wirelessly connect to another device and interface with the computing unit.

26 Claims, 16 Drawing Sheets

Related U.S. Application Data

(60) Provisional application No. 62/704,551, filed on May 15, 2020.

(56) References Cited

U.S. PATENT DOCUMENTS

| | | |
|---|---|---|
| 7,897,884 B2 | 3/2011 | Harish |
| 8,698,014 B1 * | 4/2014 | Walstad ................. G01G 19/44 177/126 |
| 2009/0143923 A1 | 6/2009 | Breed |
| 2015/0033838 A1 * | 2/2015 | Chabanon .............. B60G 11/15 280/124.179 |
| 2017/0296113 A1 * | 10/2017 | Cheung ................ A61B 5/4023 |
| 2020/0064180 A1 | 2/2020 | Goncalves |
| 2022/0057252 A1 * | 2/2022 | Krueger ................. B60G 9/003 |

OTHER PUBLICATIONS

International Preliminary Report on Patentability for International Application No. PCT/US2021/032572, mailed Nov. 24, 2022, 8 Pages.
European Search Report received in European Application No. 21804296.8 on Mar. 24, 2025.
Mexican Office Action received in Mexican Application No. MX/a/2022/014373 on May 9, 2025.

* cited by examiner

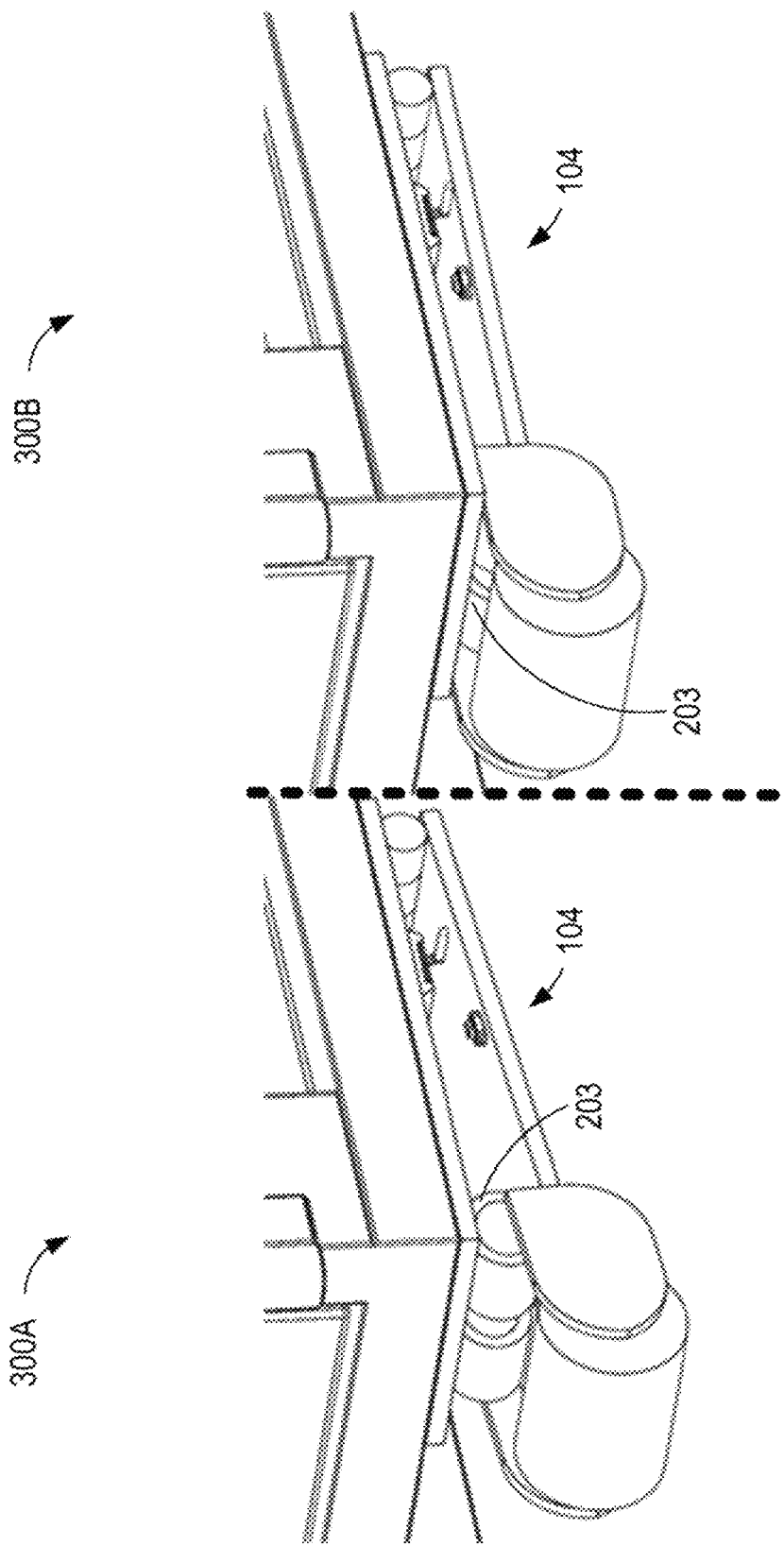

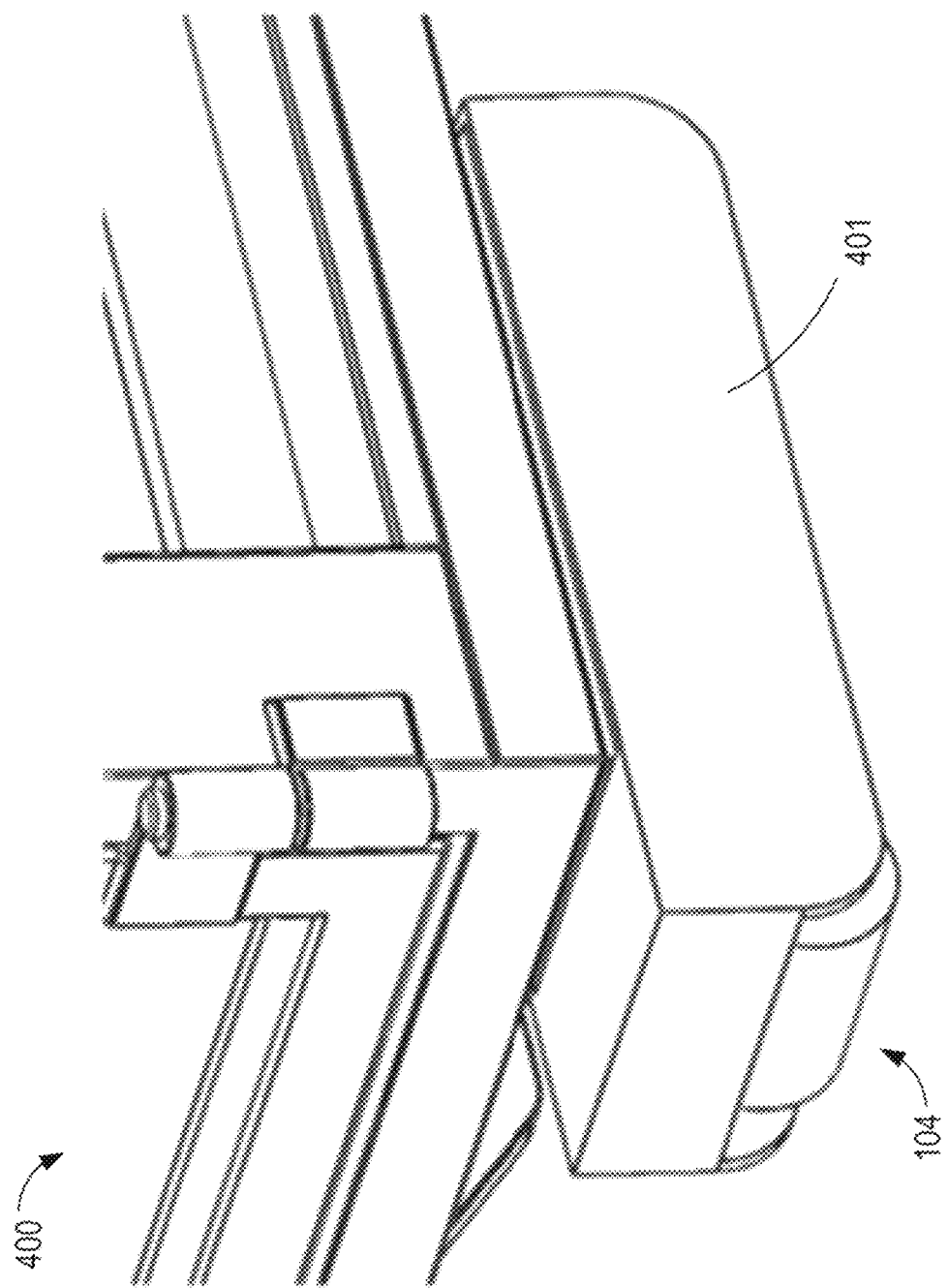

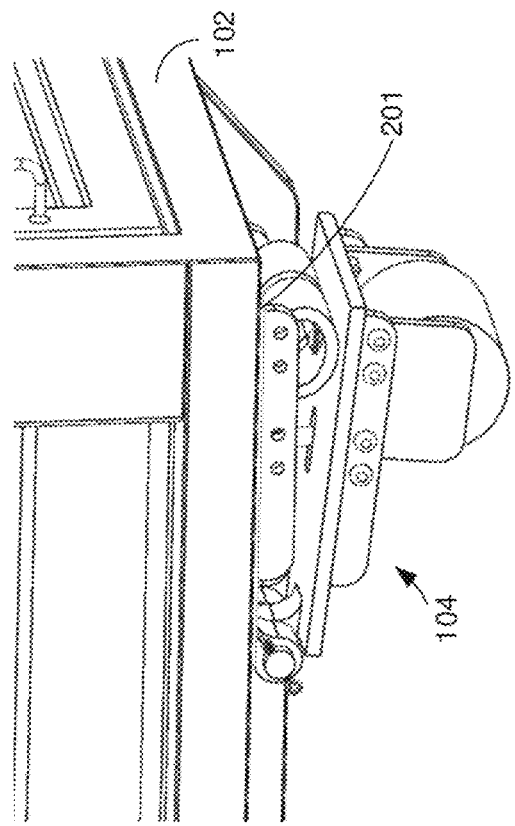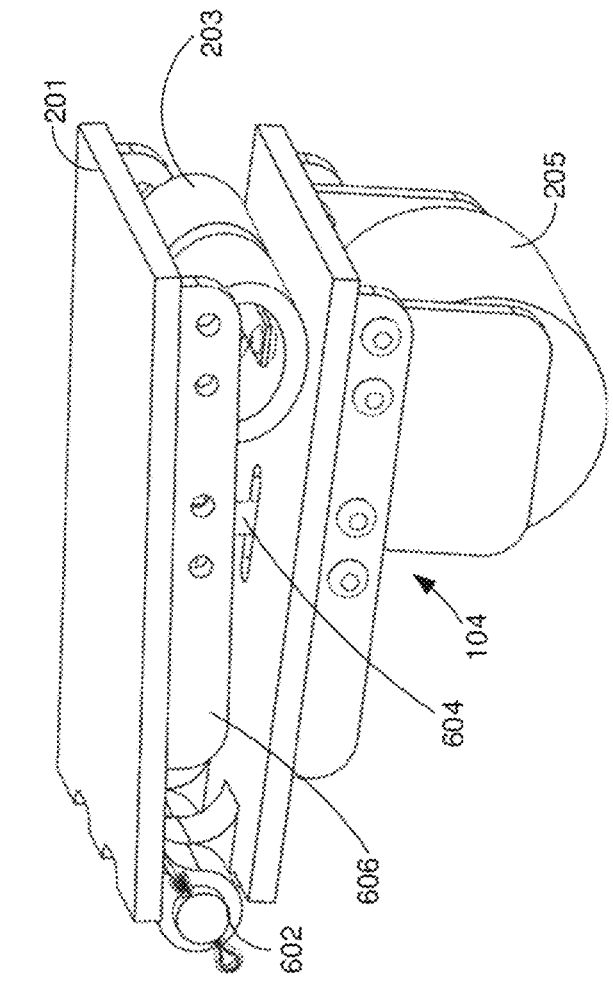
FIG. 6A
FIG. 6B

INDIRECT WEIGHT MEASUREMENT SYSTEMS AND PROCESSES

CROSS REFERENCE TO RELATED APPLICATIONS

This application is a continuation of, and claims the benefit of, and priority to, International Application No. PCT/US21/32572, filed on May 14, 2021, and entitled "INDIRECT WEIGHT MEASUREMENT SYSTEMS AND PROCESSES," which claims the benefit of, and priority to, U.S. Provisional Patent Application. No. 62/704,551, filed on May 15, 2020, and entitled "NOVEL APPARATUS AND METHOD TO PROVIDE ON-SITE DYNAMICALLY LOAD-TOLERABLE CONTAINER LOAD WEIGHTS," the disclosures of which are incorporated by reference herein in their respective entireties.

TECHNICAL FIELD

The present systems, processes, and apparatus relates generally to container load weight monitoring and reporting. More particularly, the present systems, processes, and apparatuses relate to indirect weight measurements of a load in an industrial container, railway car, a tractor trailer, agricultural trailer, or the like.

BACKGROUND

There have been many established methods of weight measurement over the years. One of the most prominent methods used is strain gauge load cells. These systems can be very precise but are generally unable to withstand and tolerate high dynamic loads. Traditional load cells often incorporate relatively stiff metal components to bear the load of whatever object is being weighed. These metal components experience some deformation while loaded, which is then measured by strain gauges affixed to the metal surface at the point of deflection. When this load is removed, assuming it was not too great or applied too quickly, the metal components rebound to their original positions. However, if the load placed on the metal components is too great or is applied too quickly, the metal components will not return to their original positions and will not be able to accurately weigh any future loads. Thus, an inability to manage dynamic, or quickly changing, loads is a key drawback of traditional load cells. Other methods for weight sensing included through acoustic transmission, and spring/lever designs. Each of these convert deformations in materials to data corresponding to weight, using fundamental principles of physics.

Weight sensors have been used in many different industries including medical, farming, packaging/shipping, and transportation. Within each industry there are many different varieties of weight sensors used. In the automobile industry for example, there are weight sensors in seats, in suspension systems, in fluid systems, and in truck beds. In the waste industry, many devices have been created due to weight serving as a key metric. Such devices are generally incorporated into the garbage hauler rather than the container itself. There are some weight devices used directly on containers, however they are of relatively small capacity (<100 gallons). There is currently no device capable of measuring large loads on-site where dynamic loading is an issue.

The waste services industry has a long history of using large containers to collect waste from a variety of sources before emptying them at landfills, transfer stations, or other such locations in order for the waste to then be processed. A variety of container types are in use today for an even wider variety of applications. Open-top roll-off dumpsters, rear-load dumpsters, front-load dumpsters, and large trash compactors are just a few examples of waste containers that may be left at sites for extended periods of time.

Waste containers are also used in a variety of applications. Large roll-off containers may be left at construction sites to be filled during demolition and renovations. Individual contractors working on smaller projects such as home-remodeling or bathroom renovations may themselves require the use of a roll-off containers for the sake of waste generated on-site. Restaurants of all kinds use front-loading containers and trash compactors to manage waste accrued during regular business operations. Each potential waste container end-user must navigate a complex system for coordinating container delivery and pickup with a container provider.

Container weight is the most important metric for container providers with regards to safety, equipment sustainability, and profitability. Further, end-customers who utilize containers are billed based on the container final weight. However, while container providers can utilize truck scales or other weighing methods at a container-emptying site to determine what to charge their customers, the end-customer that uses this container remains in a constant state of unease with regards to their final costs. Additionally, if the container is heavily overweight when a container-provider arrives to pick it up, the container provider may ask the customer to remove some material (wasting valuable time in many cases) or charge an additional fee for the truck driver to remove container waste or drive with an overweight load. In such a case whereas the customer is left with excess waste, the customer is then left to request another container to dispose of the remaining material.

In order to improve customer security and alleviate anxiety surrounding container loads, as well as to ensure safety for the container providers and truck drivers, there exists a need for both parties to be able to monitor the weight of a container while it is in use on-site. Currently, no technologies exist to perform the function of on-site weighing for large waste containers. Such a technology would allow customers to monitor the weight of a container while it is being filled, thereby estimating their final price and making allowances so that the container does not become overloaded. Further, container providers would benefit from constantly-updating weight data on their containers by allowing them to understand when a container has been filled before a customer finds time to call them and schedule a pickup, the benefits being that the waste container provider would be able to increase container usage and turnover. It has been observed that containers at customer sites often fill up prior to a pre-scheduled pickup, meaning that one container could potentially be used by two customers in a week rather than just one.

Industries outside of the waste-management industry may also have use for on-site weighing methods, including the scrap material industry where similar large containers are utilized, recycling industry, as well as the agriculture industry where real-time weight tracking is important to have on large devices such as combine harvesters. The exact benefits in these industries by use of on-site weighing methods, while not described here, are similar in scope to that of the waste industry and highly profitable.

BRIEF SUMMARY OF THE DISCLOSURE

According to one aspect, this disclosure describes novel indirect weight sensing device, systems, and related processes. In at least one embodiment, the present systems include one or more springs with known properties, at least one metal plate on which the springs are fastened and through which the container load is transferred from the container to the ground, a spring deformation sensor by which spring deformation is reckoned, a digital level by which general orientation of the upper plate is determined relative to the ground, a computing unit to collect and process data from the spring deformation sensor and digital level, and an antenna or other such hardware to wirelessly connect to another device and interface with the computing unit. In various embodiments, the present system includes components (e.g., a weight sensing device) and methodologies to tolerate large impact, dynamic loads while still accurately measuring large static loads.

Generally, a weight sensing device discussed herein may be fixed to a container to be weighted or may include a structure that is designed to be placed under a container (e.g., but not fixed to the container). In at least one embodiment, a weight sensing device may be affixed by the upper plate to the container to be weighed, while a lower plate contacts the ground. The device may be installed on one of the short sides of a container. At least two devices of the kind described herein may be implemented on a single container in accordance with its parameters, including maximum weight and size, such that the components within each device are not damaged and retain their integrity during container loading, unloading, and transportation and such that the springs in use are sufficient to bear the load of the container. The springs used in each device along with exact sizing of certain components may vary depending on the type of container on which the device may be installed, as larger and heavier containers may incur greater loads on the device and container geometries may not be sufficient for installation such as that described above.

According to a first aspect, an indirect weight measuring device including: a housing including a top plate and a bottom plate; a spring operatively connected to the top plate and bottom plate; a spring deformation sensor within the housing and configured for measuring an amount deformation of the spring; a digital level fixed to the top plate and configured for measuring an angle of inclination of the top plate; a computing device including at least one processor, wherein the at least one processor is configured for: receiving an indication of the amount of deformation of the spring from the spring deformation sensor; receiving an indication of the angle of inclination of the top plate; generating a data package including the indication of the amount of deformation of the spring and the indication of the angle of inclination of the top plate; and transmitting the data package via a network to a backend system for computing a weight of a container in contact with the housing based in least in part on: a weight determined by comparing the indication of the amount of deformation of the spring to pre-stored data associated with characteristics of the spring; and the angle of inclination of the top plate.

According to a second aspect, the indirect weight measuring device of the first aspect or any other aspect, wherein the housing includes a bar shape.

According to a third aspect, the indirect weight measuring device of the second aspect or any other aspect, wherein the housing includes a first area including metal components for contacting the container.

According to a fourth aspect, the indirect weight measuring device of the third aspect or any other aspect, wherein the housing includes a second area including plastic components and including the computing device for transmitting the data package through the plastic components.

According to a fifth aspect, the indirect weight measuring device of the first aspect or any other aspect, wherein the housing is affixed to the container.

According to a sixth aspect, the indirect weight measuring device of the fifth aspect or any other aspect, wherein the housing is bolted to the container.

According to a seventh aspect, the indirect weight measuring device of the fifth aspect or any other aspect, wherein the housing is welded to the container.

According to an eighth aspect, the indirect weight measuring device of the first aspect or any other aspect, wherein the housing further includes at least one stand-off for preventing the spring from bottoming out.

According to a ninth aspect, the indirect weight measuring device of the first aspect or any other aspect, wherein the spring deformation sensor includes a strain gauge.

According to a tenth aspect, the indirect weight measuring device of the first aspect or any other aspect, wherein the spring deformation sensor includes a distance sensor or an angular sensor.

According to an eleventh aspect, the indirect weight measuring device of the first aspect or any other aspect, wherein the housing is weather-proof.

According to a twelfth aspect, the indirect weight measuring device of the eleventh aspect or any other aspect, wherein the housing includes one or more seals to prevent water from entering the housing.

According to a thirteenth aspect, the indirect weight measuring device of the first aspect or any other aspect, wherein the housing includes vibration dampening adhesive.

According to a fourteenth aspect, the indirect weight measuring device of the first aspect or any other aspect, further including a temperature sensor within the housing and configured for measuring a temperature within the housing.

According to a fifteenth aspect, the indirect weight measuring device of the fourteenth aspect or any other aspect, wherein: the at least one processor is further configured for receiving an indication of the temperature within the housing from the temperature sensor; the data package further includes the indication of the temperature; and the weight is determined by comparing the indication of the amount of deformation of the spring and the indication of temperature to pre-stored data associated with characteristics of the spring.

According to a sixteenth aspect, a process for indirectly computing a weight including: receiving a data package including: a deformation value associated with a particular spring; an angle of inclination of a container relative to a surface; computing a weight for a load of material based at least in part on characterizing the received deformation value as one of a plurality of deformation values stored in memory associated with the type of spring; modifying the weight of the load material based on the computed weight for the load of material and the angle of inclination of the container; and displaying the modified weight of the load of material on a display screen.

According to a seventeenth aspect, a process for indirectly computing a weight including: receiving a deformation value associated with a particular spring from a deformation sensor; receiving an angle of inclination of a container relative to a surface from a digital level; computing a weight for a load of material based at least in part on characterizing the received deformation value as one of a plurality of deformation values stored in memory associated with the type of spring; modifying the weight of the load of material based on the computed weight for the load of material and the angle of inclination of the container; and displaying the modified weight of the load of material on a display screen.

According to an eighteenth aspect, a process for indirectly computing a weight including: determining a plurality of deformation values for a particular type of spring, the plurality of deformation values based at least in part on a plurality of temperatures; storing the plurality of deformation values in memory; receiving a deformation value associated with a particular spring of the particular type of spring from a deformation sensor; receiving an angle of inclination of a container relative to a surface from a digital level; receiving a temperature value associated the particular spring; computing a weight for a load of material based at least in part on characterizing the received deformation value as one of a plurality of deformation values stored in memory associated with the type of spring and based at least in part on the temperature value; modifying the weight of the load of material based on the computed weight for the load of material and the angle of inclination of the container; and displaying the modified weight of the load of material on a display screen.

According to a nineteenth aspect, the process for indirectly computing a weight of the eighteenth aspect or any other aspect, wherein characterizing the received deformation value as one of the plurality of deformation values includes comparing the received deformation value and the temperature value to a deformation value of the plurality of deformation values associated the temperature value.

According to a twentieth aspect, a system for indirectly computing a weight of a container including: a memory storing predetermined characteristics of a type of spring, the predetermined characteristics including: deformation characteristics of the type of spring under a plurality of conditions; and a plurality of deformation values associated with the deformation characteristics; and at least one processor operatively connected to the memory, the at least one processor configured for: receiving a data package from a device in contact with a container loaded with material, the data package including: a deformation value associated with a particular spring of the type of spring; an angle of inclination of the container relative to the surface; computing a weight for the load of material based at least in part on characterizing the received deformation value as one of the plurality of deformation values stored in memory; modifying the weight of the load of material based on the computed weight for the load of material and the angle of inclination of the container; and displaying the modified weight of the load of material on a display screen.

According to a twenty-first aspect, the system of the twentieth aspect or any other aspect, wherein the plurality of conditions include a duration of time between compressions.

According to a twenty-second aspect, the system of the twenty-first aspect or any other aspect, wherein the received deformation value is different than a previously received deformation value for the load of material stored in memory.

According to a twenty-third aspect, the system of the twenty-second aspect or any other aspect, wherein a first condition of the plurality of conditions includes a duration of time between receiving different deformation values.

According to a twenty-fourth aspect, the system of the twenty-third aspect or any other aspect, wherein: the at least one processor is further configured for computing a duration of time between the receiving the deformation value and receiving the previously received formation value; and characterizing the received deformation value as one of the plurality of deformation values stored in memory is based on the duration of time.

According to a twenty-fifth aspect, the system of the twenty-fourth aspect or any other aspect, wherein a second condition of the plurality of conditions includes an amount of time between a time when the modified weight of the load of material is equal to zero and a current time.

According to a twenty-sixth aspect, the system of the twenty-fifth aspect or any other aspect, wherein characterizing the received deformation value as one of the plurality of deformation values stored in memory is based on the amount of time.

According to a twenty-seventh aspect, the system of the twenty-sixth aspect or any other aspect, wherein a third condition of the plurality of conditions includes a number of changes in the modified weight of the load of material.

According to a twenty-eighth aspect, the system of the twenty-seventh aspect or any other aspect, wherein characterizing the received deformation value as one of the plurality of deformation values stored in memory is based on the number of changes in the modified weight of the load of material.

According to a twenty-ninth aspect, the system of the twenty-eighth aspect or any other aspect, wherein a forth condition of the plurality of conditions includes a plurality of temperatures associated with the type of spring.

According to a thirtieth aspect, the system of the twenty-ninth aspect or any other aspect, wherein: the data package further includes a temperature value; and characterizing the received deformation value as one of the plurality of deformation values stored in memory is based on the temperature value and the plurality of temperatures associated with the type of spring.

These and other aspects, features, and benefits of the claimed system and process(es) will become apparent from the following detailed written description of the embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 3A illustrates a perspective view of an exemplary decompressed weight sensing device, according to one embodiment of the present disclosure;

FIG. 3B illustrates a perspective view of exemplary compressed weight sensing device, according to one embodiment of the present disclosure;

FIG. 4 illustrates a perspective view of an exemplary weight sensing device, according to one embodiment of the present disclosure;

FIG. 6A illustrates a perspective view of an exemplary weight sensing device mounted onto a container, according to one embodiment of the present disclosure;

FIG. 6B illustrates a perspective view of an exemplary weight sensing device bolted onto a container, according to one embodiment of the present disclosure;

DETAILED DESCRIPTION

Figure 1:
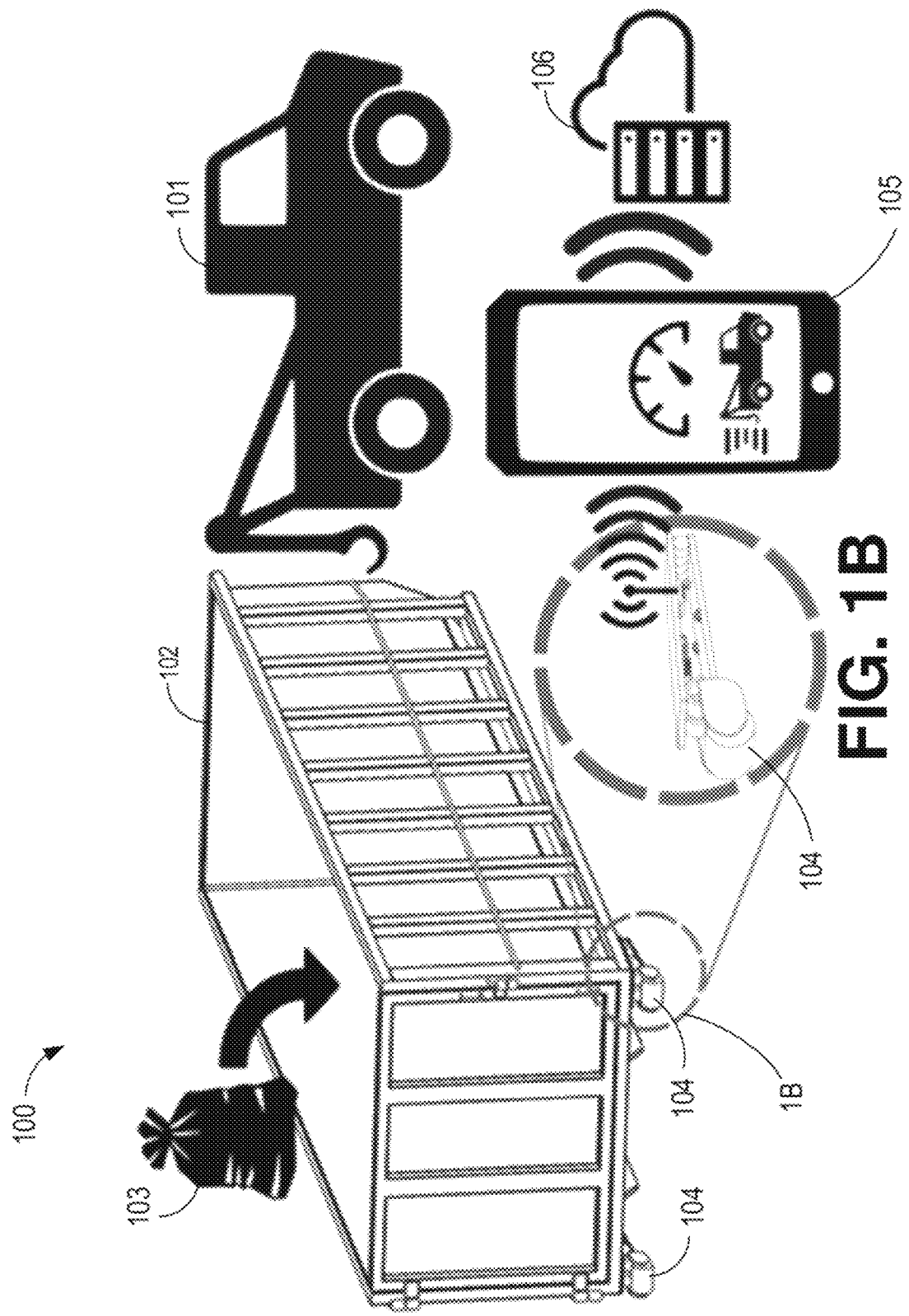
FIG. 1A illustrates an exemplary system environment of an exemplary indirect weight sensing system, according to one embodiment of the present disclosure.
FIG. 1B illustrates a magnified view of an exemplary weight sensing device, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to indirect weight measurement systems, devices, and processes. As further discussed herein, in at least one embodiment, the system indirectly computes a weight of a load (e.g., a load in a container, rail car, agricultural trailer, tractor trailer, etc.) by determining a deformation of one or more springs within a housing in contact with the container, rail car, etc. (e.g., the housing is under the container, rail car, etc.) and certain conditions about the one or more springs that may affect deformation (e.g., temperature, humidity, material, etc.), then computing the weight of the load based a comparison or matching of the deformation of the one or more springs to pre-stored data regarding spring deformation under the certain conditions. As also discussed herein, in some embodiments, the system may determine an angle of inclination of a portion of the housing or container, rail car, etc. and compute the weight of the load based on computing a moment of inertia based on the weight of the load mentioned above and the angle of inclination (e.g., the system determines a force/weight of the load based on comparison/matching of the deformation of the one or more springs to pre-stored data regarding spring deformation under the certain conditions, then uses the determined force/weight and the angle of inclination to compute a final weight via a moment of inertia calculation).

In at least one embodiment, the system includes a sensing device (e.g., weight sensing device) that includes a spring (e.g., a polymer spring or a metal spring), one or more sensors, including a spring deformation sensor, a digital level, one or more other sensors, and a computing unit. As will be understood from discussions herein, the sensor device may be in the form of a wheel housing (for a container) and welded or bolted to a container, a bar, platform, or other suitable form.

In some embodiments, the sensing device is communicably connected to a backend system via one or more networks. In these embodiments (and others), the sensing device transmits data associated with deformation of the spring caused by a load in a container in contact with the sensing device and conditions within the sensing device (or otherwise affecting the spring, such as temperature) to the backend system for processing. According to various embodiments, the backend system includes a memory storing deformation characteristics associated with the spring (or with a spring of the same type and/or material as the spring of the sensing device). In one or more embodiments, the backend system determines a force (e.g., a weight) associated with the deformation of the spring based on the stored deformation characteristics (e.g., the spring may deform differently depending on environmental or use factors). In particular embodiments, the backend system computes a final weight for the load in the container by computing a moment of inertia based on an angle of the container.

EXEMPLARY EMBODIMENTS

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing aspects of the claimed system and processes, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the disclosure and the claims.

New weight sensing devices, apparatuses, and methods for determining on-site container weight are discussed herein. In the following description, for purposes of explanation, numerous specific details are set forth in order to provide a thorough understanding of the present aspects. It will be evident, however, to one skilled in the art that the present aspects may be practiced without these specific details.

Indirect Weight Sensing System

Referring now to the figures, for the purposes of example and explanation of the fundamental processes and components of the disclosed systems and methods, reference is made to FIG. 1A, which illustrates an exemplary, high-level overview 100 of one embodiment of the indirect weight sensing system. As will be understood and appreciated, the exemplary, high-level overview 100 shown in FIG. 1A represents merely one approach or embodiment of the present system, and other aspects are used according to various embodiments of the present system.

FIG. 1A shows an exemplary system environment of an exemplary indirect weight sensing system 100, according to one embodiment of the present disclosure. In various embodiments, the indirect weight sensing system 100 (also the "system 100") may include a weight sensing device 104 (the "device" or "sensing device") that collects sensor data 105 that is compared to predetermined data by a backend system 106 to compute the weight of one or more loads 103 inside a container 102. As depicted in FIG. 1, in many embodiments, a hauling vehicle 101 may be utilized to transport a container 102 to a site, where the container 102 may receive one or more loads 103 in the container 102 (e.g., a machine or person may throw trash away inside the container). In some embodiments, the weight sensing device 104 may collect and transmit sensor data 105 to a backend system 106. In at least one embodiment, the backend system 106 may compute the weight of the load 103 inside the container 102 by comparing the sensor data 105 to predetermined data. In one embodiment, the container 102 may be removed from the site by the hauling vehicle 101 once the weight of the load 103 inside the container 102 reaches a certain weight limit. In one or more embodiments, the backend system 106 may transmit a communication to a driver of the hauling vehicle 101 to notify the driver that the weight limit of the container 102 has been reached and to remove the container 102 from the site. In one embodiment, the backend system 106 may include or be operably connected to a computing device (e.g., personal computer, tablet, smart phone, mobile device, smart watch, etc.) with a user interface via a software or mobile application, and the backend system 106 may cause the data 105 to be displayed on the computing device.

FIG. 1B shows a magnified view of an exemplary weight sensing device, according to one embodiment of the present disclosure. An embodiment of this weight sensing device is shown in additional detail in FIG. 2, described below.

Sensing Device

Figure 2:
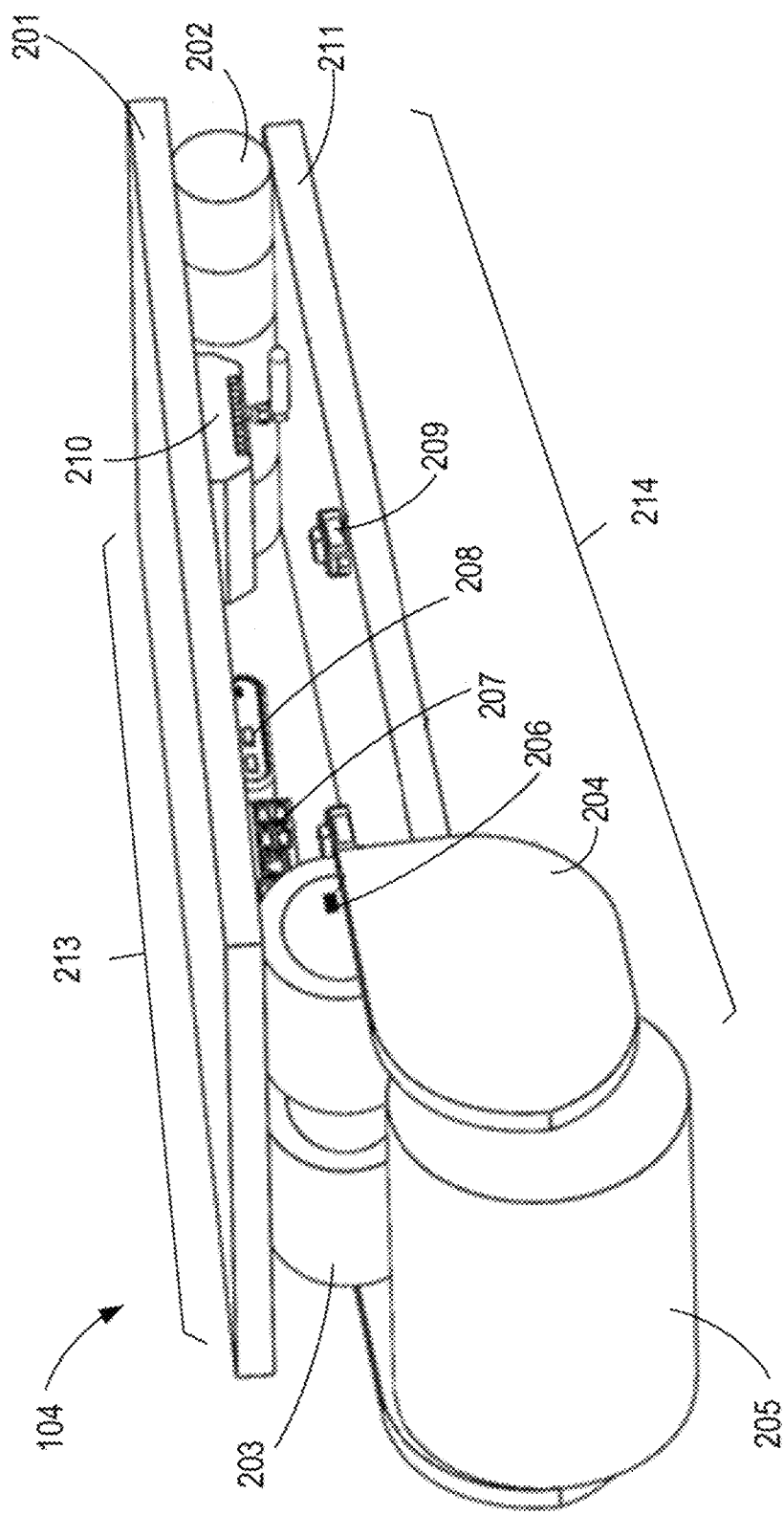
FIG. 2 illustrates a perspective view of an exemplary weight sensing device, according to one embodiment of the present disclosure.

An exemplary weight sensing device 104 is shown in FIG. 2, according to one embodiment of the present disclosure. In multiple embodiments, the weight sensing device 104 may include an upper plate 201 that is connected to a lower plate 211 via a hinge 202. In at least one embodiment, the upper plate 201 and lower plate 211 may both be generally rectangular and be made of steel, though both may be other shapes and/or made of other materials, such as aluminum, copper, titanium, iron, or other similar materials. In some embodiments, the lower plate 211 and the upper plate 201 may be both generally the same length and width. In many embodiments, the weight sensing device 104 may be affixed to the underside of the container 102 or may be separate from the container so that the container may be placed on top of the weight sensing device 104.

In several embodiments, the lower plate 211 may be affixed to one or more wheels 205. In one or more embodiments, the lower plate 211 may be affixed to standoffs 204, and the one or more wheels 205 may also be affixed to the standoffs 204, thus affixing the one or more wheels 205 to the lower plate 211. In many embodiments, the one or more wheels 205 include an axel that goes through the center of the one or more wheels 205 and connects to the standoffs 204, and the standoffs 204 may be bolted or welded to the lower plate 211. In some embodiments, the wheel 205 may be made of steel, or any similar material. In at least one embodiment, the wheel 205 may be approximately 6 inches in diameter and 6-10 inches in width. In other embodiments, the wheel may be approximately 2-10 inches in diameter, and may have a width from 4-12 inches. In yet further embodiments, the wheel 205 may have a larger or smaller diameter and/or width depending on the size of the container 102. In many embodiments, the wheel 205 may contact the ground or otherwise be utilized in maneuvering the container 102. In one or more embodiments, the system 106 may utilize certain dimensions in the calculation of container weight including, but is not limited to, length 213 (the distance between the hinge 202 and spring 203 contact point), length 214 (the distance between the hinge 202 and wheel 205), and the height of the deformed spring 203. In many embodiments, the upper plate 201 and the lower plate 211 may form an angle relative to each other, and the system 106 may measure the angle to calculate the height of the spring 203.

In multiple embodiments, the upper plate 201 and the lower plate 211 may be separated by one or more springs 203, shown in the FIG. 2 as being round and vaguely cylindrical. In at least one embodiment, the springs 203 include a metal (e.g., steel, aluminum, iron, copper, etc.) or a polymer with known mechanical properties, such as, but not limited to, withstanding both dynamic and static loads with minimal hysteresis. In one embodiment, the polymer may be a thermoplastic elastomer, such as, but not limited to, polyethylene terephthalate (PET), polystyrene (PS), polycarbonate (PC), polypropylene (PP), high-density polyethylene (HDPE), polytetrafluoroethylene (PTFE), low-density polyethylene (LDPF), and/or some similar material. In one or more embodiments, the spring 203 may be about 5-12 centimeters in diameter, but may have larger or smaller diameter depending on the size of the container 102 or the expected weight of the load 103. In some embodiments, the spring 203 may experience deformation by up to 70% of the unloaded free vertical height of the spring 203. In one or more embodiments, once the load 103 has been removed from the container, the spring 203 may rebound to the unloaded free vertical height within a certain time period (e.g., five minutes) and may not experience any permanent deformation. In many embodiments, each individual spring 203 may withstand up to 3000 pounds static load and 2250 inch-pounds dynamic loading. In one embodiment, the weight sensing device 104 may utilize a plurality of the one or more springs 203 to measure the weight of the load 103. In at least one embodiment, the springs 203 experience predictable deformation as a function of applied loads, including but not limited to, load weight, time between applied loads 103, amount of loads 103 applied over time, and amount of time a load 103 has been applied on the springs 203, and given certain environmental conditions including but not limited to temperature and/or humidity. In one embodiment, hysteresis of such springs 203 is limited and predictable or non-existent.

In various embodiments, the springs 203 are affixed to the weight sensing device 104. In one or more embodiments, the springs 203 may be mounted to the lower plate 211 via a through-hole fastener, bolt, or other similar connection methods. In one embodiment, the springs 203 may have a diameter that is between 2-6 inches in a related state. In at least one embodiment, the upper plate 201 may be prevented from bottoming out against the lower plate 211 by way of standoffs 204 on either side. In many embodiments, the standoffs 204 may rise above the lower plate 211 by approximately 1.4 inches. In other embodiments, the standoffs 204 may rise above the lower plate 211 by approximately 0.5-3 inches. In yet another embodiment, the standoffs 204 may rise above the lower plate 211 at a distance that is sufficient for the given application (e.g., to prevent the upper plate 201 from bottoming out) and as will occur to one of ordinary skill in the art. In one embodiment, the standoffs 204 may be approximately 6 inches wide, 8 inches wide, and 0.75 inches thick. In other embodiments, the standoffs 204 may be approximately 3-10 inches wide, 4-12 inches long, and 0.25-1.5 inches thick. In some embodiments, the standoffs 204 prevent the spring 203 from being compressed beyond the deformable limit which could otherwise lead to the spring's 203 mechanical characteristics being lost or altered over time.

In various embodiments, the energy absorbed by each spring 203 when a load 103 is placed into the container 102 would fall well within the maximum possible energy that a chosen spring 203 could absorb according to various embodiments herein. As will be understood from discussions herein, a container 102 is positioned on-site, the container 102 may experience some dynamic loading that the spring 203 should withstand.

In one or more embodiments, the sensor data from dynamic loading events may not be used when displaying actual load weight to a user. In at least one embodiment, if the system determines that a dynamic loading event has occurred, the system may discard the corresponding spring deformation measurement so that the weight calculation is not affected by the dynamic loading event. In one embodiment, the system may utilize the spring deformation measurement and/or other data to classify a dynamic loading event as either significant or insignificant by determining/computing whether the dynamic loading event was persistent or momentary in nature; if the system determines that the dynamic loading event is momentary in nature, the system may filter out the corresponding data. For example, in one embodiment, an insignificant and temporary dynamic loading event is the impulse loading that occurs when a container is lowered off of a truck and initially impacts the ground. In certain embodiments, another example of a temporary and insignificant dynamic loading event may be the impulse of a load 103 dropping into a container 102 (e.g., the force of the load hitting the container may cause a momentary increase in the spring deformation, which the system filters out).

In various embodiments, the sensor data from dynamic loading events may be utilized by the system 106 to track instances when the spring 203 has been dynamically compressed, because a spring 203 that has been dynamically compressed due to a dynamic loading event may behave differently (e.g., may compress more under subsequent static loading) than a spring 203 that has not undergone a dynamic loading event.

In multiple embodiments, the weight sensing device 104 may also include a spring deformation sensor 206. In one embodiment, the spring deformation sensor 206 may measure the amount the one or more springs 203 are deformed (e.g., compressed) when a load 103 is applied to the weight sensing device 104 (e.g., placed in the container 102). In certain embodiments, the amount the one or more springs 203 have deformed may be measured by measuring the distance between the upper plate 201 and the lower plate 211 after a load 103 has been put into the container 102, or by measuring the difference in spring height directly. In at least one embodiment, the spring deformation sensor 206 may be a strain gauge mounted within the spring 203 on the lower plate 211, a distance sensor mounted on either the upper plate 201 or lower plate 211, bend sensors, displacement sensors, light detection and ranging (LIDAR) sensors, ultrasonic distance sensors, potentiometers, flexible sensors, and/or linear or angular encoders (optical, magnetic, and/or capacitive), or any other sensor that can measure the deformation of the springs 203 once a load 103 is placed into a container 102. In certain embodiments, if the spring deformation sensor 206 is an angle sensor, the system 106 or computing unit 207 may calculate the spring height by dividing the distance 214 (distance from the hinge to the middle of the wheel 205 on the weight sensing device 104) by the distance 213 (distance from the hinge to the middle of the springs 203), and multiplying the resulting figure by the calculated weight divided by a constant (e.g., 8). In one or more embodiments, the spring deformation sensor 206 may be mounted using adhesive or some other such bonding method, or using standard hardware mounting methods such as utilizing nuts and bolts.

In several embodiments, the weight sensing device 104 may also include a digital level 209, an accelerometer, and/or a gyroscope. In some embodiments, the digital level 209 is affixed to either the upper plate 201 or the lower plate 211. In at least one embodiment, the digital level 209 may be fastened to the lower plate 211 using vibration-dampening adhesive. In one or more embodiments, the digital level 209 and gyroscope and/or accelerometer may calculate the orientation of the weight sensing device 104 relative to the ground. In many embodiments, the digital level 209 may measure the angle of either the upper plate 201 or lower plate 211 relative to an abstract level ground. In certain embodiments, the gyroscope and/or accelerometer may measure the angle of the weight sensing device 104 relative to the actual ground surface (e.g., the gyroscope can determine if the container is on a hill). In at least one embodiment, the backend system 106 or computing unit 207 may calculate the angle of inclination using the measurements from the digital level 209 and the gyroscope and/or accelerometer. In one or more embodiments, the backend system 106 may utilize the angle of inclination in the moment of inertia determination. In some embodiments, the accelerometer may measure the impact load on the container, and if the accelerometer experiences an impact/sudden change that is representative of a dynamic loading event, then the system may discard the sensor data. In one embodiment, the accelerometer may sense the impact of a load 103 put into the container 102, which may trigger the computing unit 207 to wake up and collect sensor data or poll for sensor data from the spring deformation sensor 206, environmental sensors, and/or digital level 209.

In many embodiments, sensing device 104 (and/or the indirect weight sensing system), using the aforementioned configuration, may determine its angular inclination relative to the ground has changed depending upon deformation of the springs 203 in relation to the amount of load in the container 102. For example, in one embodiment, as the container 102 receives more loads 103, the springs 203 may increasingly deform proportionally to the total weight of the loads 103 inside the container. Continuing with the example, in at least one embodiment, as the springs 203 deform, the angle of the container relative to the ground may change. In one or more embodiments, the backend system 106, the weight sensing device 104, or the system application may calculate the weight of the container 102 via a moment calculation about the end opposite the position of the device 104. In one embodiment, the digital level 209 measures the current angle of inclination of the container 102 and transmits the current angle of inclination measurement to a computing unit 207. In certain embodiments, the spring deformation sensor 206 determines the spring deformation measurement and transmits the spring deformation to the computing unit 207. In some embodiments, the spring deformation and the angle of inclination measurements are utilized by the system to calculate the force of gravity exerted upon the loaded container 102 on one end (e.g., the end of the container 102 that is connected to the device 104) and to correlate that force measurement to a known weight.

In multiple embodiments, the weight sensing device 104 may also include one or more environmental sensors (not shown in FIG. 2) for measuring environmental data. In some embodiments, the environmental data include a temperature and/or humidity at the location of the container 102, three-dimensional object location data (e.g., the distance an object is away from the environmental sensor and/or the shape of the object), and/or material and volumetric data inside the container 102 (e.g., a three-dimensional camera may extend from the weight sensing device 104 so that the three-dimensional camera can view and transmit images of the inside of the container 102). In one embodiment, the three-dimensional camera may transmit images to the backend system 106 (via the computing unit 207) for processing, which may determine the material(s) of the load 103 inside the container 102 and the volumetric data of the container 102 (e.g., how filled the container 102 is). In many embodiment, the environmental sensors 1306 may transmit the environmental data to the computing unit 207. In one or more embodiments, the environmental sensors may include, but are not limited to, temperature sensors, humidity sensors, LIDAR sensors, three-dimensional cameras, and/or other similar sensors.

In various embodiments, the weight sensing device 104 may also include a computing unit 207, a battery 208, and an antenna 210 (e.g., a radio). In one or more embodiments, the computing unit 207 may receive and process data from the spring deformation sensor 206, digital level 209, and/or environmental sensors. In one embodiment, the computing unit 207 may be an IOT module. In certain embodiments, the computing unit 207 utilizes the antenna 210 to interface wirelessly with another device, sending and receiving data 105 regarding the angle of inclination measurement, the spring deformation, and other data (e.g., temperature and humidity data). In at least one embodiment, the battery 208 is utilized to power the spring deformation sensor 206, the computing unit 207, the digital level 209, and the antenna 210. In one embodiment, each of the spring deformation sensor 206, the computing unit 207, the digital level 209, and/or the antenna 210 may be fastened in place on the weight sensing device 104 using a vibration-dampening adhesive or some other such appropriate method. In one or more embodiments, the antenna 210 may be an external antenna attached to the top or side of a container 102 and in communication (wired or wireless) with the computing device 207 in order to have a stronger signal for communication with the backend system 106. In several embodiments, the electrical components of the weight sensing device 104 (e.g., the spring deformation sensor 206, the computing unit 207, the battery 208, the digital level 209, the antenna 210, and/or other components) may have a height less than the height of the standoffs 204 (e.g., less than 1.4 inches) so that the components may not be damaged when the springs 203 are fully deformed.

FIG. 3A shows a perspective view 300A of an exemplary weight sensing device 104, according to one embodiment of the present disclosure. In the embodiment shown in FIG. 3A, the weight sensing device is affixed to the container 102 and the springs 203 are in an undeformed state, indicating that there is no load 103 in the container 102. In some embodiments, the springs 203 may be deformed slightly even if there is no load 103 in the container 102 due to the weight of the container 102 pushing down on the springs 203. In one embodiment, if the container weight does cause the springs 203 to deform (e.g., without a load 103 in the container 102), the spring deformation sensor 206 may utilize the height of the deformed springs 206 under the load of a container as a starting point for measuring the spring deformation, rather than the height of the springs 206 that are not deformed.

FIG. 3B shows a perspective view 300B of an exemplary weight sensing device 104, according to one embodiment of the present disclosure. In several embodiments, as shown in FIG. 3B, the springs 203 are deformed, and the distance between upper plate 201 and the lower plate 211 has changed, indicating that there is a load 103 in the container 102. In many embodiments, the spring deformation sensor 206 may measure the height of the deformed springs 206 and transmit the measurement data 105 to the computing unit 207. In some embodiments, the spring deformation sensor 206 may transmit measurement data 105 each time a load 103 is placed into the container 102, or may transmit measurement data 105 on a time interval (e.g., transmit the measurement data every 5 minutes, every 30 minutes, etc.), or may transmit measurement data 105 once the spring deformation sensor measures a certain change in height of the springs 206 (e.g., transmit the measurement data once the height of the springs changes by at least 0.01 centimeters, or the springs have a 1% increase in height difference, etc.).

FIG. 4 shows a perspective view 400 of an exemplary weight sensing device 104, according to one embodiment of the present disclosure. In various embodiments, the components of the weight sensing device 104 may be covered or enclosed with a housing 401 to prevent dirt, dust, water, insects, and other similar contaminants from entering the weight sensing device and to protect the components from being mechanically agitated. In some embodiments, certain job sites, such as construction sites, may naturally create a more dirt or dust-filled environment, in which the weight sensing device 104 with a housing 401 may be preferred. In at least one embodiment, the housing 401 may be made of a hard plastic material or other similar materials, such that the components of the weight sensing device are protected and the antenna 210 may transmit the data 105 to the backend system 106. In one or more embodiments, the housing 401 may be a rectangular prism shape such that the weight sensing device 104 is enclosed within the housing 401. In some embodiments, the housing 401 may be any shape (e.g., sphere, cube, etc.). In one embodiment, the housing 401 may define an opening proximate to the wheel 205 so that the wheel 205 can contact the ground. In at least one embodiment, the housing 401 may be weather-proof. In many embodiments, the housing 401 may include grommets at connection points (e.g., screw or bolt hole), sealants, and weather proof material. In some embodiments, the housing 410 may be approximately 8 inches in height, 12 inches in width, and 24 inches in length. In other embodiments, the housing 410 may be approximately 4-16 inches in height, 8-25 inches in width, and 8-30 inches in length.

Mounted Weight Sensing Device

As will be understood from discussions herein, a sensing device (e.g., sensing device 104) may be operatively connected to a container or other suitable structure in any suitable way. In one embodiment, a weight sensing device enclosed in a housing may be mounted (removably via bolts, screws, or the like) or fixed (e.g., welded) to a container or other suitable structure. In particular embodiments, a sensing device may be included in a removable bar or scale, upon which a container or other suitable structure may be placed or otherwise loaded.

Figures 5A, 5B:
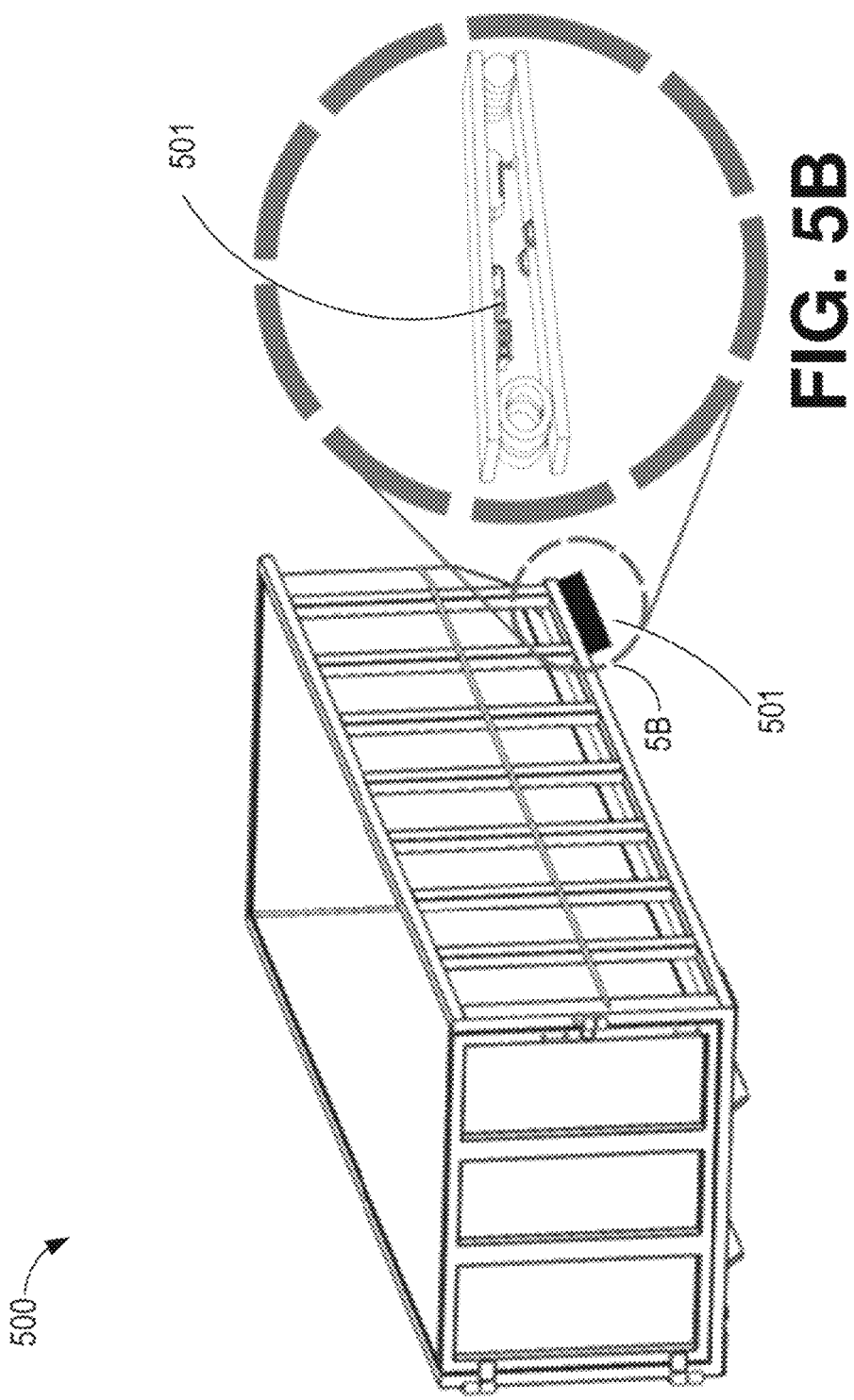
FIG. 5A illustrates an exemplary weight sensing device connected to a container, according to one embodiment of the present disclosure.
FIG. 5B illustrates a magnified view of an exemplary weight sensing device, according to one embodiment of the present disclosure.

FIG. 5A shows a perspective view 500 of an exemplary weight sensing device 501 mounted onto a container 102, according to one embodiment of the present disclosure. In one or more embodiments, the weight sensing device 501 may be affixed to either end of the container 102. In many embodiments, as shown in FIG. 5 the weight sensing device 501 may be affixed to a container 102 and may not utilize wheels 205.

FIG. 5B shows a magnified view of the exemplary weight sensing device 501, according to one embodiment of the present disclosure. In many embodiments, the weight sensing device 501 may be affixed on the end of a roll-off container 102. In at least one embodiment, the components of weight sensing device 104 are also included in weight sensing device 501 except for the wheels 205. In one embodiment, the weight sensing device 501 may also include a housing 401.

In FIG. 6A, a view 600A of exemplary weight sensing device 104 welded onto the container 102 is shown, according to one embodiment of the present disclosure. In some embodiments, the upper plate 201 may be welded onto the container 102, which may create a permanent connection between the container 102 and the weight sensing device 104.

In various embodiments, depending on the size of the container 102 that the device 104 is to be connected to, the upper plate 201 and the lower plate 211 may be sized differently. In at least one embodiment, the upper plate 201 and the lower plate 211 may be approximately 22 inches in length, 11 inches in width, and 0.75 inches in thickness. In other embodiments, the upper plate 201 and the lower plate 211 may be approximately 8-30 inches in length, 8-25 inches in width, and 0.25-2 inches thick. In yet other embodiments, the upper plate 201 and the lower plate 211 may include any dimensions that are sufficient for the given application and as will occur to one of ordinary skill in the art.

In FIG. 6B, a view 600B of exemplary weight sensing device 104 connected to a container 102 is shown, according to one embodiment of the present disclosure. In at least one embodiment, the weight sensing device 104 may be connected to the container via a pin and bolt configuration. In many embodiments, in this configuration, the lower plate 211 may cover the wheel 205, so that the springs 203 may be above the wheel 205.

In some embodiments, the upper plate 201 and the lower plate 211 may each define openings on the end of each plate that combine to form a hinge 602 such that a pin may be inserted through each of the openings to connect the upper plate 201 and the lower plate 211 together. In one embodiment, a bolt 604 may be inserted through the lower plate 211 and into or through the upper plate 201 to further connect the upper plate 201 and lower plate 211. In certain embodiments, the bolt 604 may be bolted into the container 102 to connect the weight sensing device 104 to the container 102.

In various embodiments, the weight sensing device 104 may include one or more standoffs 606. In at least one embodiment, the standoffs 606 may be affixed to the upper plate 201. In one or more embodiments, the standoffs 606 may prevent the springs 203 from deforming beyond the deformable limit, which could otherwise lead to the spring's 203 mechanical characteristics being lost or altered over time, by preventing the upper plate 201 from bottoming out against the lower plate 211.

Figure 7:
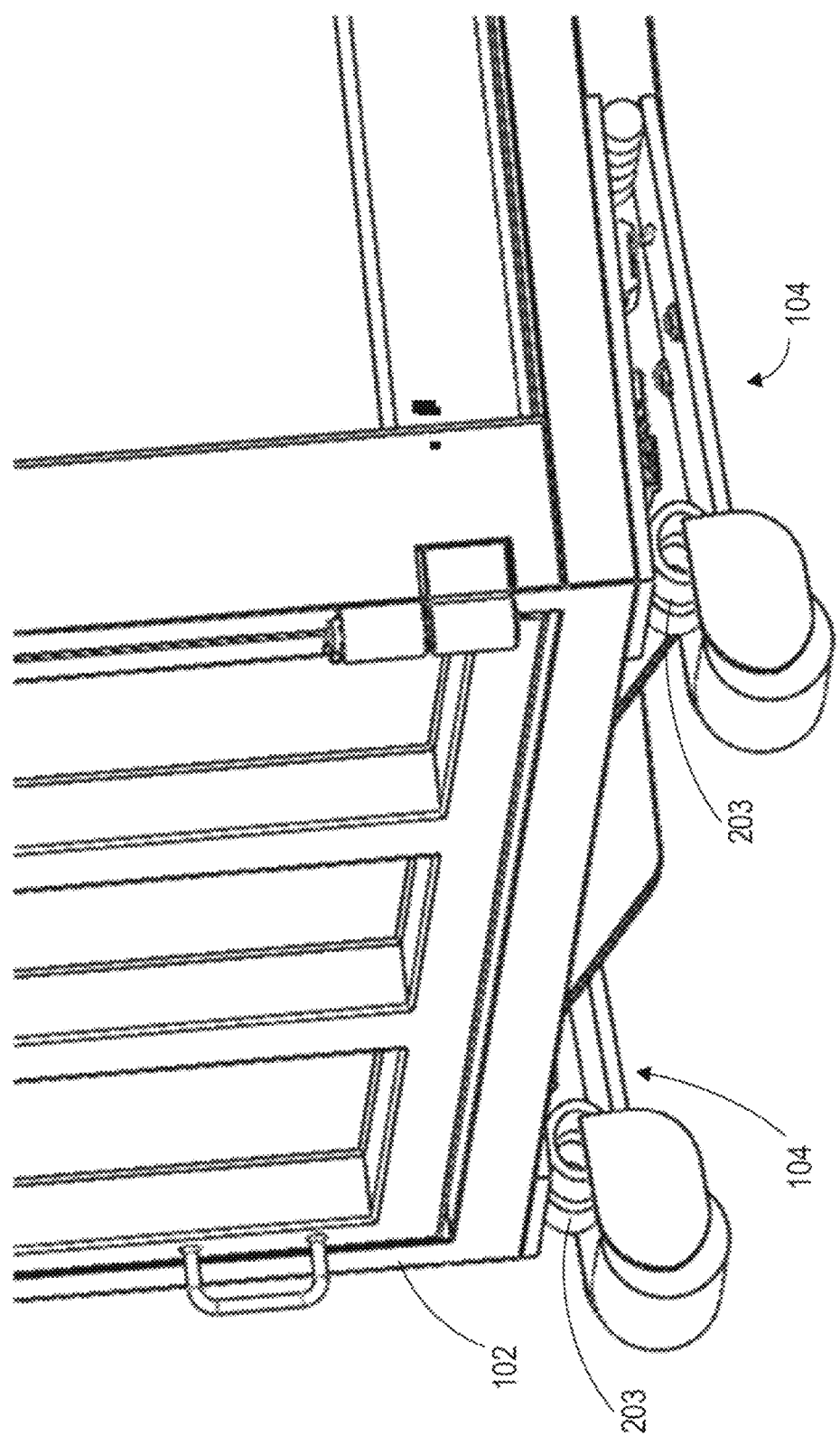
FIG. 7 illustrates a perspective view of multiple exemplary weight sensing devices connected to a container, according to one embodiment of the present disclosure.

FIG. 7 shows two exemplary weight sensing devices 104 mounted onto a container 102, according to one embodiment of the present disclosure. In some embodiments, including two (or more) weight sensing devices on the container 102 may be preferred for weight distribution purposes, and may be utilized on containers 102 with excessively large expected loads, so that the springs 203 are not compressed beyond their mechanical limits.

Figure 8:
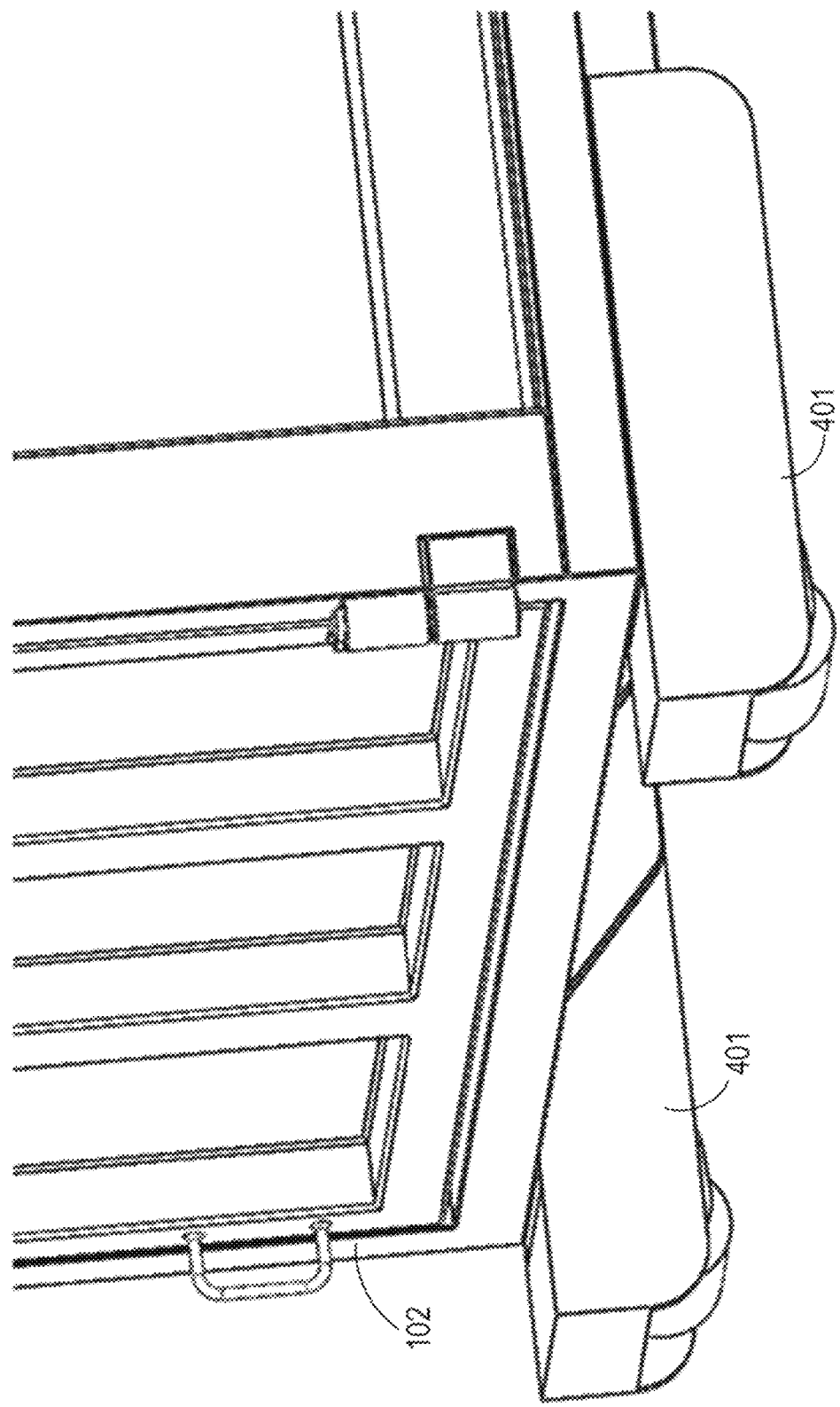
FIG. 8 illustrates a perspective view of multiple covered exemplary weight sensing devices connected to a container, according to one embodiment of the present disclosure.

FIG. 8 shows two exemplary weight sensing devices 104 mounted onto a container 102, according to one embodiment of the present disclosure. As shown in FIG. 8, each of the weight sensing devices 104 has a housing 401 surrounding the weight sensing device 104.

Weight Sensing Platform

According to embodiments herein, the weight sensing platform may be utilized as a scale for containers, rail cars, and other loads. In one embodiment, the weight sensing platform may include similar components as the weight sensing device. In some embodiments, the weight sensing platform may be portable, or may be fixed in a particular location, such as, but not limited to, a ship yard for measuring the weight of shipping containers.

Figure 9:
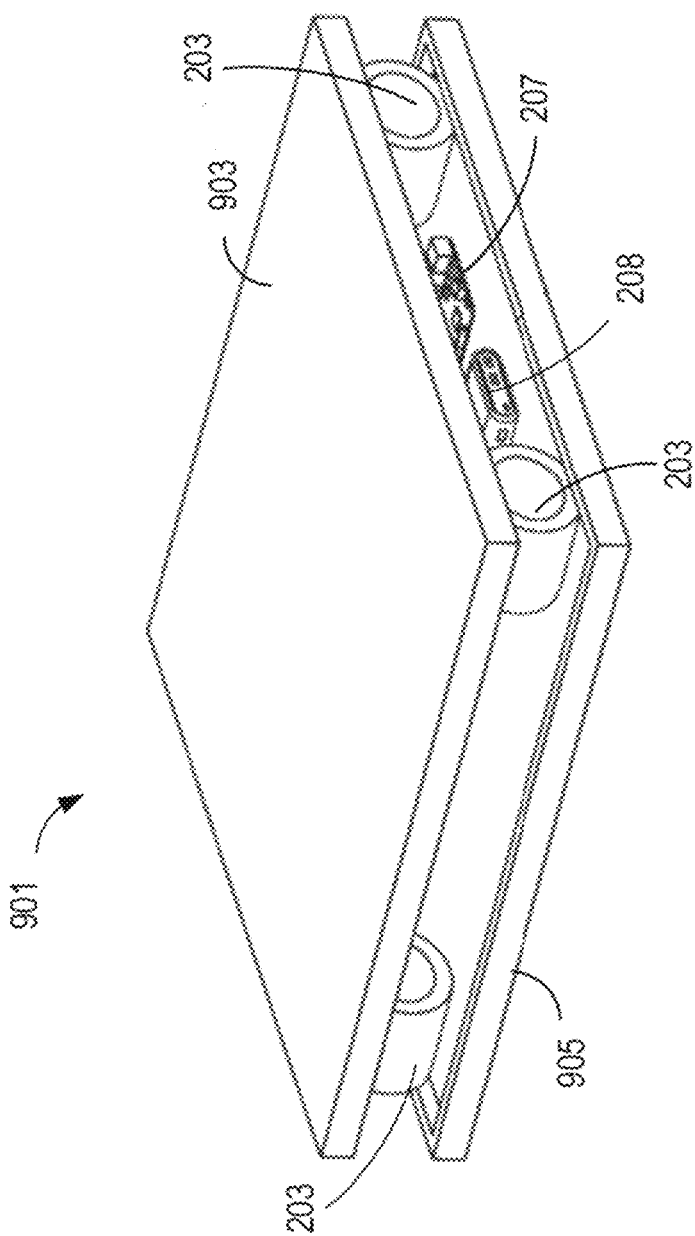
FIG. 9 illustrates a perspective view of an exemplary weight sensing platform, according to one embodiment of the present disclosure.

FIG. 9 shows an exemplary weight sensing platform 901, according to one embodiment of the present disclosure. In various embodiments, the weight sensing platform 901 acts as a scale while retaining dynamic loading capabilities. In many embodiment, the platform 901 includes the electronic components 206-210 (as described in FIG. 2) as well as the springs 203. In one or more embodiments, the platform 901 may include an upper plate 903 and a lower plate 905 connected to each other. In some embodiments, the upper plate 903 and the lower plate 905 may be made of steel or another similar material (e.g., aluminum, iron, rubber, etc.), and may be square shaped, or any other shape (e.g., circle, rectangle, octagon). In certain embodiments, the platform 901 may include one or more springs 203, each of the one or more springs 203 contacting the upper plate 903 and the lower plate 905 in each corner of the plates 903 and 905. In at least one embodiment, the platform 901 functions as a standalone device and does not need to be attached to a container 102 in order to function consistently. In one embodiment, the platform 901 may measure the weight of any load applied to the platform 901 by one or more spring deformation sensors measuring the spring deformation and transmitting the measurement data to the system 106 for weight determination. In one embodiment, the platform 901 may include only one spring deformation sensor 206 that can measure the deformation of each of the springs 203 in the platform 901.

Bar Apparatus

According to embodiments herein, the bar apparatus may be utilized as a weight sensing device for containers, rail cars, and other loads. In particular embodiments, embodiments of the bar apparatus may be sized to fit under different sized containers. In one embodiment, the bar apparatus may include similar components as the weight sensing device. In some embodiments, the bar apparatus may be portable.

Figure 10:
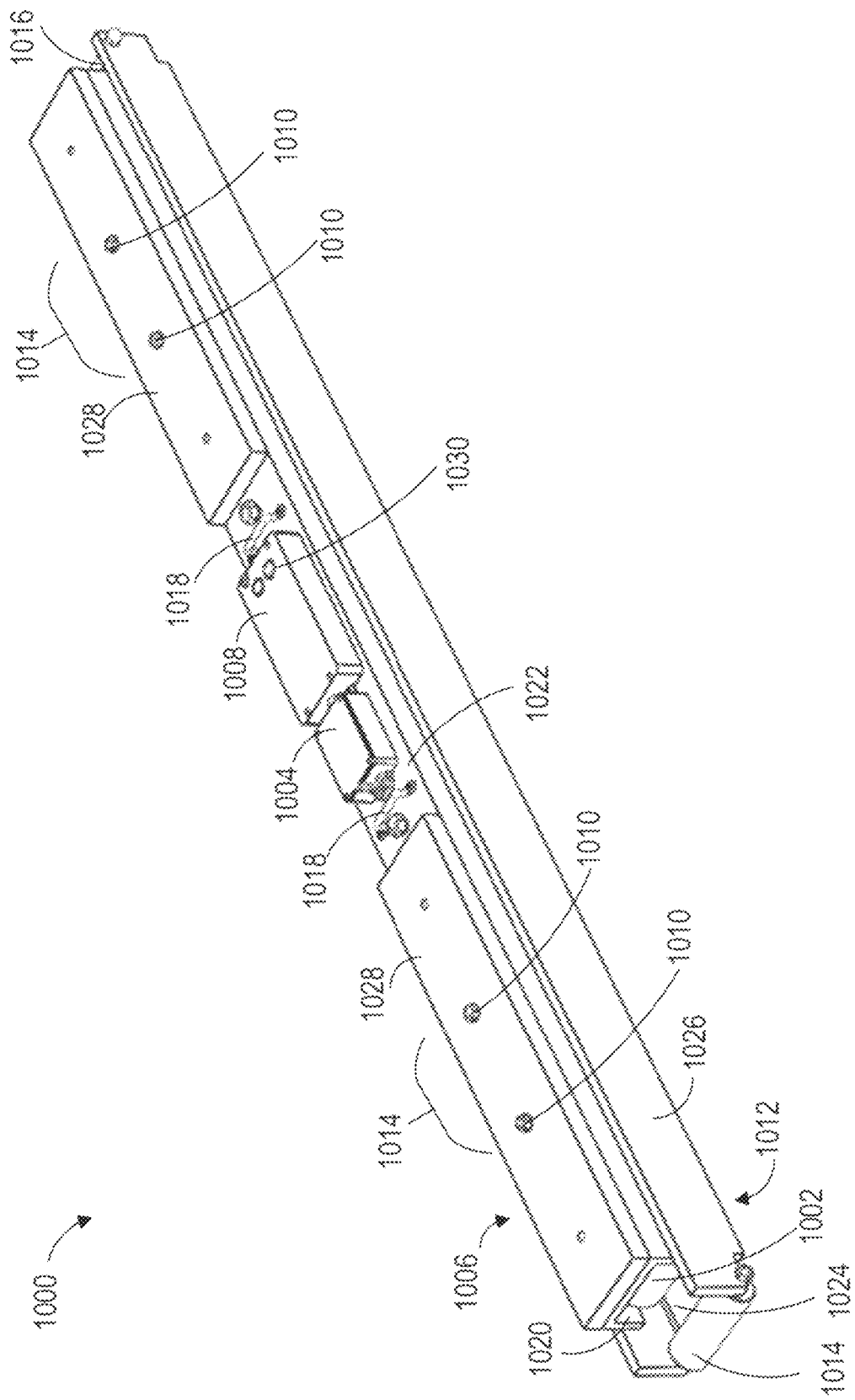
FIG. 10 illustrates a perspective view of an exemplary weight sensing bar apparatus, according to one embodiment of the present disclosure.

FIG. 10 shows an exemplary weight sensing bar apparatus 1000, according to one embodiment of the present disclosure. In various embodiments, the bar apparatus 1000 may include one or more springs 1002, battery 1004, a top channel 1006, an electronics housing 1008, bolts 1010, bottom channel 1012, a wheel 1014, a handle 1016, and/or strap attachments 1018. In some embodiments, the bar apparatus 1000 may also include a computing device, an antenna, one or more deformation sensors, one or more environmental sensors, and a digital level (all not shown in the FIG. 10). In several embodiments, the springs 1002 may be affixed to either the top channel 1006 and/or the bottom channel 1012. In at least one embodiment, the components included in the bar apparatus 1000 may be generally the same as the components in the weight sensing device 104. In one or more embodiments, a user may place the bar apparatus 1000 under a container 102 so that weight of the container 102 is on the bar apparatus 1000. In at least one embodiment, each load 103 that is placed into the container 102 applies a force onto the bar apparatus 1000, causing the springs 1002 to deform. In many embodiments, the spring deformation sensors may measure the spring deformation as the force from the loads 103 are applied to the bar apparatus 1000, and transmit the spring deformation measurements to the computing device. In one embodiment, the computing device may calculate the weight of the loads 103 in the container, or transmit the data via the antenna to the system 106 to calculate the weight. In at least one embodiment, two or more bar apparatuses 1000 may be utilized with one container, with at least one bar apparatus 1000 at each end of the container 102. In this embodiment, each of the two or more bar apparatuses 1000 may transmit weight measurement data and other data to a backend system 106, which can determine the weight of the loads 103 in the container 102. In one embodiment, one of the two bar apparatuses 1000 may transmit weight measurement data and other data to the other bar apparatus 1000, via wired communications or wireless communications (e.g., Bluetooth, NFC, WiFi, etc.), such that the other bar apparatus 1000 may aggregate the data for both bar apparatuses 1000 and transmit the data to the backend system 106.

In several embodiments, the bar apparatus 1000 may be utilized on any surface, including but not limited to, concrete, dirt, gravel, sand, wood, etc., by placing the bar apparatus 1000 on the surface and placing the container 102 on top of the bar apparatus. In one or more embodiments, the surface may not be an even surface (e.g., the surface may include an incline), and the digital level may determine the angle of the bar apparatus 1000 and/or container 102 on the surface and transmit the angle measurement to the computing device.

In certain embodiments, the bar apparatus 1000 may include a top channel 1006 and a bottom channel 1012. In at least one embodiment, the top channel 1006 and the bottom channel 1012 may enclose the internal components (e.g., environmental sensors, antenna, spring deformation sensor, computing unit, digital level, and/or springs) and protect the internal components from the outside environment. In some embodiments, the top channel 1006 and the bottom channel 1012 may be made of steel, aluminum, or any other material with similar hardness and structural characteristics such that the bar apparatus 1000 can support the weight of the container 102 and the one or more loads 103. In certain embodiments, the bar apparatus 1000 may be a general rectangular prism shape, but may be any other shape (e.g., cylindrical, etc.).

In various embodiments, the top channel 1006 may include a top portion 1022 and standoffs 1020 that project downwards from the top portion 1022 and prevent the top portion 1022 from bottoming out to ensure that the springs 1002 do not deform past the deformable limit and become permanently deformed. In some embodiments, the top channel 1006 may include one or more plates 1028 on top of the top portion 1022 to further support the weight of the container 102. In certain embodiments, the plates 1028 may be a plate or block of a steel, aluminum, rubber, or other similar materials that can support the weight of the container 102. For example, in one embodiment, the top channel 1006 may include a steel plate (e.g., the plate 1028) affixed to the top portion 1022 of the top channel 1006. In at least one embodiment, each of the top plates 1028 may have a top surface that has a coating or additional layer on the top surface to assist with maintaining proper contact between the bar apparatus 1000 and the container 102. In several embodiments, the coating or additional layer on the top surface of the top plates 1028 may include, but are not limited to, skid tape, one or more sheets of rubber, metal strips, etc. In one or more embodiments, the width of the top channel 1006 is less than the width of the bottom channel, so that the standoffs 1020 may fit inside the bottom channel 1012. In one embodiment, the standoffs 1020 may be approximately 1.4 inches in height. In other embodiments, the standoffs 1020 may be approximately 0.5-3.0 inches in height. In yet other embodiments, the standoffs 1020 may be a height that is sufficient for the given application and as will occur to one of ordinary skill in the art. In some embodiments, the bottom channel 1012 may include a bottom surface 1024 and two sidewalls 1026 projecting up from the bottom surface 1024. In many embodiments, the bottom channel 1012 may be the base support for the bar apparatus 1000.

In many embodiments, the top channel 1006 may span the length of the bar apparatus 1000. In at least one embodiment, the battery 1004 and/or electronics housing 1008 may protrude up from the top portion 1022 of the top channel 1006 (as shown in FIG. 10), or may be under the top portion 1022. In some embodiments, the top channel 1006 or the plate 1028 may include two pairs of bolts 1010, the bolts 1010 in each pair spaced length 1014 apart, indicating the area on the bar apparatus 1000 that the legs 1102 (see FIG. 11B) of the container 102 are to be placed when using the bar apparatus 1000. In one embodiment, the length 1014 may be approximately 5.25 inches. In other embodiments, the length 1014 may be approximately 3-12 inches. In yet other embodiments, the length 1014 may be spaced at any distance that is sufficient for the given application and as will occur to one of ordinary skill in the art.

In various embodiments, the bar apparatus 1000 may be approximately 4.75 inches in height, 5 inches in width, and 63 inches in length. In other embodiments, the bar apparatus 1000 may be approximately 3-12 inches in height, 3-12 inches in width, and 48-80 inches in length. In yet other embodiments, the bar apparatus 1000 may include any dimensions that are sufficient for the given application and as will occur to one of ordinary skill in the art. In one or more embodiments, the distance between the two pairs of bolts 1010 may be approximately 37.5 inches (e.g., the distance between the two legs 1102). In other embodiments, the distance between the two pairs of bolts 1010 may be approximately 25-60 inches.

In multiple embodiments, the electronics housing 1008 may house the antenna, spring deformation sensor, environmental sensors, and digital level. In many embodiments, the antenna, environmental sensors, digital level, and/or spring deformation sensor may be inside the electronics housing 1008. In some embodiments, the electronics housing 1008 may be made of a material that allows the antenna to transmit and receive data. In one or more embodiments, the electronics housing 1008 may be weather-proof, such that the internal components housed in the electronics housing 1008 are protected from wind, rain, dirt, dust, snow, and other similar environmental contaminants. In one embodiment, the electronics housing 1008 may be weather-proof by being made of weather-proof materials, utilizing grommets in connection holes to prevent entry of dirt, air, water, etc., into the electronics housing 1008, sealing the edges of the electronics housing 1008 with water-proof sealant, and/or other similar weather-proofing concepts. In some embodiments, the electronics housing 1008 may be made of a material that, in addition to being weather-proof, also allows the antenna to transmit and receive data to and from the backend system 106 (e.g., a hard plastic or the like). In many embodiments, the electronics housing 1008 may be approximately 6 inches long, 4 inches wide, and 3 inches high. In other embodiments, the dimensions of the electronics housing 1008 may be approximately 4-8 inches long, 2-6 inches wide, and 2-5 inches high. In yet other embodiments, the dimensions of the electronics housing 1008 may be any dimension larger or smaller depending on the size of the bar apparatus 1000 and sufficient for the given application.

In several embodiments, the electronics housing 1008 may also include one or more buttons 1030 to allow a user to interface with the electronics housing 1008. In at least one embodiment, the one or more buttons 1030 may include on/off switches, a tare command switch (e.g., command to zero the apparatus 1000), system reset buttons, troubleshooting buttons, and/or other buttons with similar commands. In one or more embodiments, the one or more buttons 1030 may include indication lights (e.g., LEDs, etc.) that indicate different statuses of the bar apparatus 1000, or the electronics housing 1008 may have separate indication lights apart from the one or more buttons 1030. In one embodiment, the indication lights may indicate that an error has occurred, that the computing unit is transmitting data, and/or that the apparatus 1000 is in a troubleshooting mode, etc.

In at least one embodiment, the battery 1004 may provide power to the electrical components of the bar apparatus 1000. In one or more embodiments, the battery 1004 may be removable and/or replaceable. In one embodiment, the battery 1004 may also be weather-proof by using weather-proof materials, grommets at connection points, and/or water-proof sealant. In some embodiments, the battery 1004 may not be removable, but instead may be rechargeable using a plug-in cable connected to a power supply or solar power.

In various embodiments, the spring deformation sensors may be generally the same type of sensor as the spring deformation sensor 206. In many embodiments, the spring deformation sensors may measure the spring deformation and transmit the spring deformation measurement to the computing unit. In at least one embodiment, the spring deformation sensors may include bend sensors, displacement sensors, (light detection and ranging (LIDAR) sensors, ultrasonic distance sensors, potentiometers, flexible sensors, and/or linear or angular encoders (optical, magnetic, and/or capacitive), or any other sensor that can measure the deformation of the springs 1002 once a load 103 is placed into a container 102. In one embodiment, the bar apparatus 1000 may include only one spring deformation sensor that can measure the deformation of each of the springs 1002 in the bar apparatus 1000.

In multiple embodiments, the bar apparatus 1000 may also include a wheel 1014, a handle 1016, and/or strap attachments 1018. In at least one embodiment, the wheel 1014 may be a durable wheel that a user can use to transport the bar apparatus 1000. In many embodiments, the wheel 1014 is made of a material that is able to withstand the environment (e.g., metal, hard plastic, etc.). In one embodiment, the material that the wheel 1014 is made of may enable the wheel 1014 to not scratch the ground during transport. In certain embodiments, the handle 1016 may be utilized by a user to hold one end of the bar apparatus 1000 up while rolling the bar apparatus 1000 on the wheel 1014. In one embodiment, the bar apparatus 1000 may include a wheel 1014 and a handle 1016 on each end of the bar apparatus 1000. In several embodiments, the strap attachments 1018 may allow a user to pick up the bar apparatus 1000 or to attach straps to the bar apparatus 1000 to enable carrying the bar apparatus 1000.

Figure 11A:
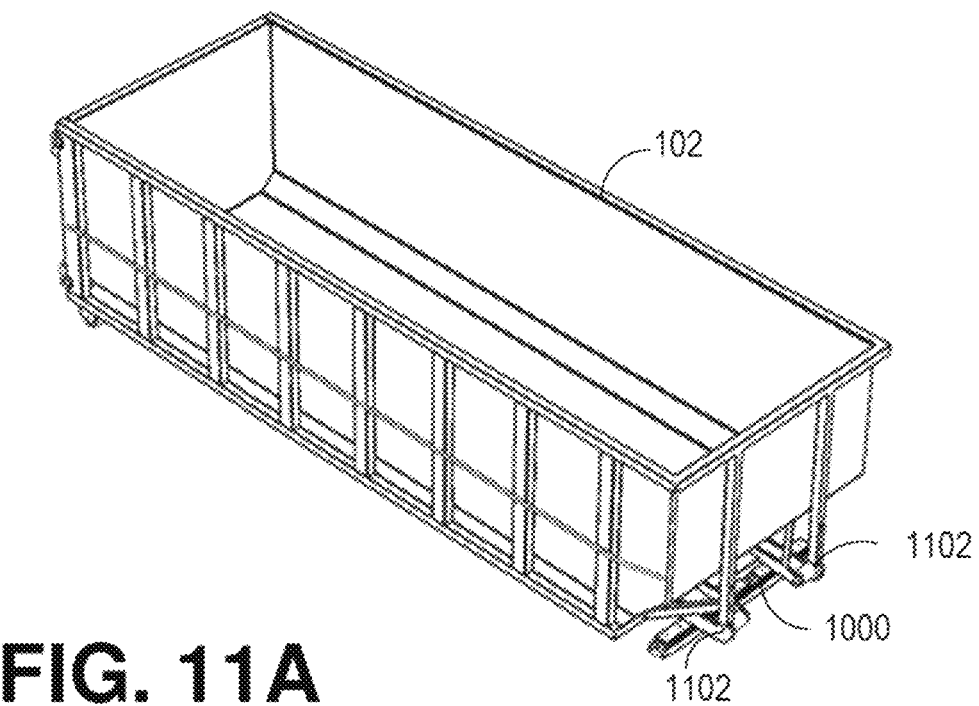
FIG. 11A illustrates a perspective view of a container on an exemplary weight sensing bar apparatus, according to one embodiment of the present disclosure.
Figure 11B:
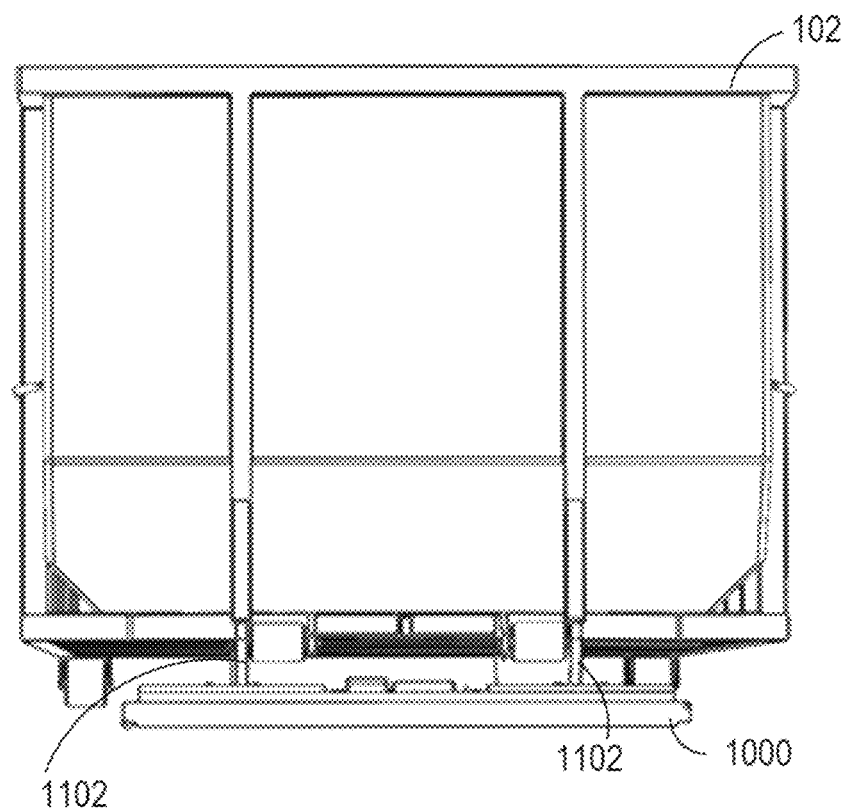
FIG. 11B illustrates a front view of a container on an exemplary weight sensing bar apparatus, according to one embodiment of the present disclosure.

Turning to FIG. 11A and FIG. 11B, shown is a perspective view (FIG. 11A) and a side view (FIG. 11B) of a container 102 on an exemplary weight sensing bar apparatus 1000, according to one embodiment of the present disclosure. In multiple embodiments, as shown in both FIGS. 11A and 11B, container 102 may include legs 1102 that protrude out from the container 102. In certain embodiments, the legs 1102 may not protrude out from the container 102 as shown in FIGS. 11A and 11B, but may be under the container 102. In some embodiments, in either case, the legs 1102 may be placed on the bar apparatus 1000 in order for the system to calculate the weight of the container 102 as the container 102 is loaded. In many embodiments, each of the legs 1102 of the container 102 may be placed in between a pair of bolts 1010 on plate 1028 (as shown in FIG. 10).

Figure 12:
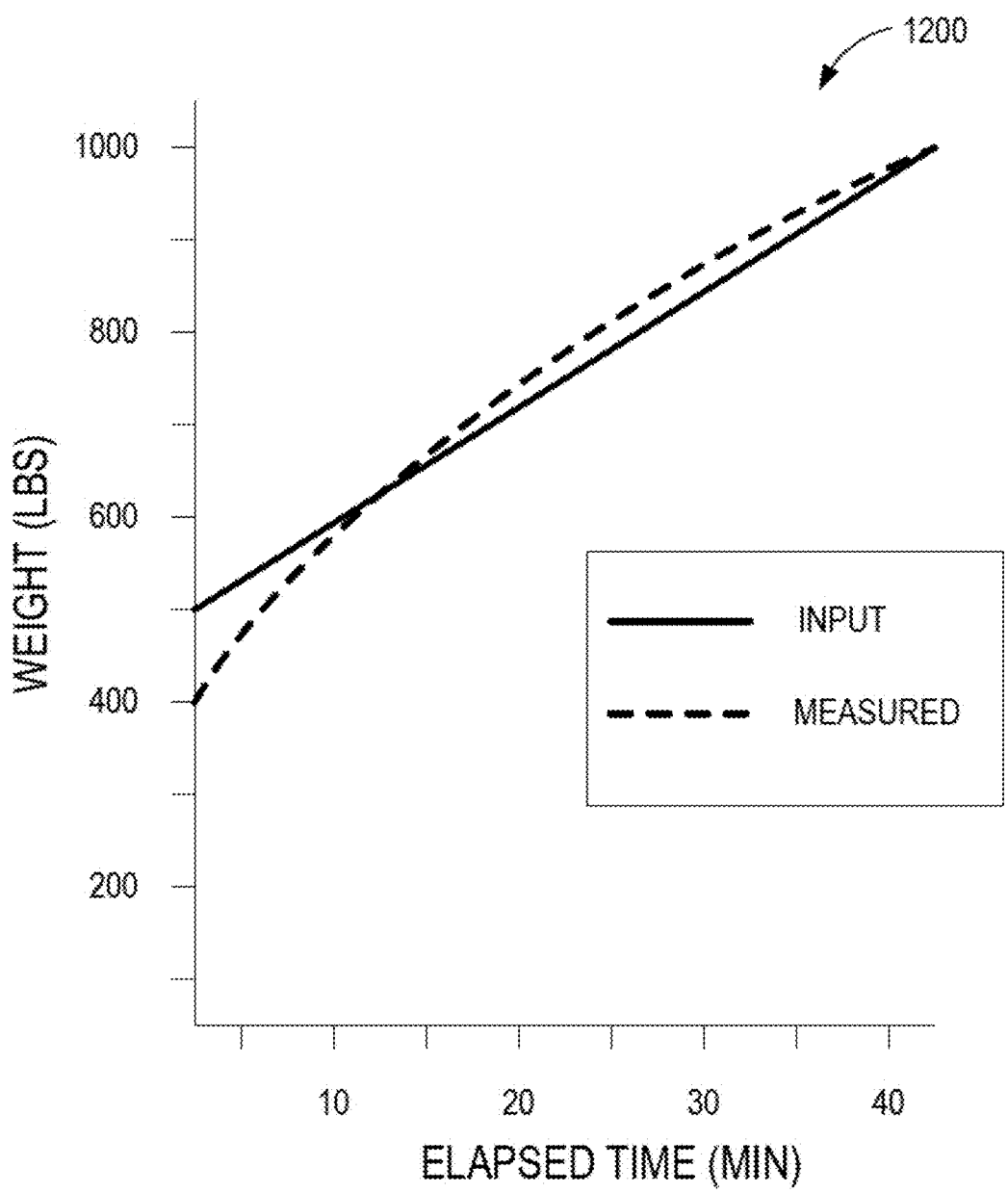
FIG. 12 illustrates a response of time of sensor distance measurements converted to weight measurements, according to one embodiment of the present disclosure.

FIG. 12 shows a graph 1200 of response time of sensor distance measurements converted to weight measurement, according to one embodiment of the present disclosure. In several embodiments, graph 1200 shows how weight measurements derived from a weight sensing device 104 as described herein may change with time. In one or more embodiments, the sensor distance measurement data was taken using a structural testing machine utilizing a spring deformation sensor 206, and may vary depending on the type of spring 203, the type of spring deformation sensor 206, and/or other features of the design of the overall device.

In one embodiment, the sensor distance measurement (e.g., spring deformation measurements) was collected using a time of flight sensor as the spring deformation sensor 206, but similar data could be ascertained with other types of spring deformation sensors as described herein. In at least one embodiment, the weight measurement data is representative of limited hysteresis in the springs 203, rather than data from an actual functional device 104.

In many embodiments, the graph 1200 shows an input of various known weights on a spring 203, and resulting computed weights for the spring 203 (e.g., via the systems and methods herein). The graph 1200 generally shows that the computed weights (via the indirect weight systems and processes discussed here) are generally accurate.

Computing Device/IoT Components/Backend System 106

According to embodiments herein, the system may include a weight sensing device (e.g., in any suitable form, such as mounted weight sensing device, weight sensing platform, bar apparatus) that includes sensor components (e.g., spring deformation sensor, digital level, etc.) that connect to an onboard IOT computing unit (e.g., computing unit 207), which can send sensor data to a backend system 106 through a network so that the backend system 106 can compute the weight of the container (and/or any loads included therein). In some embodiments, the backend system 106 may transmit the weight information and other data to a computing device that displays the weight information and other information.

Figure 13:
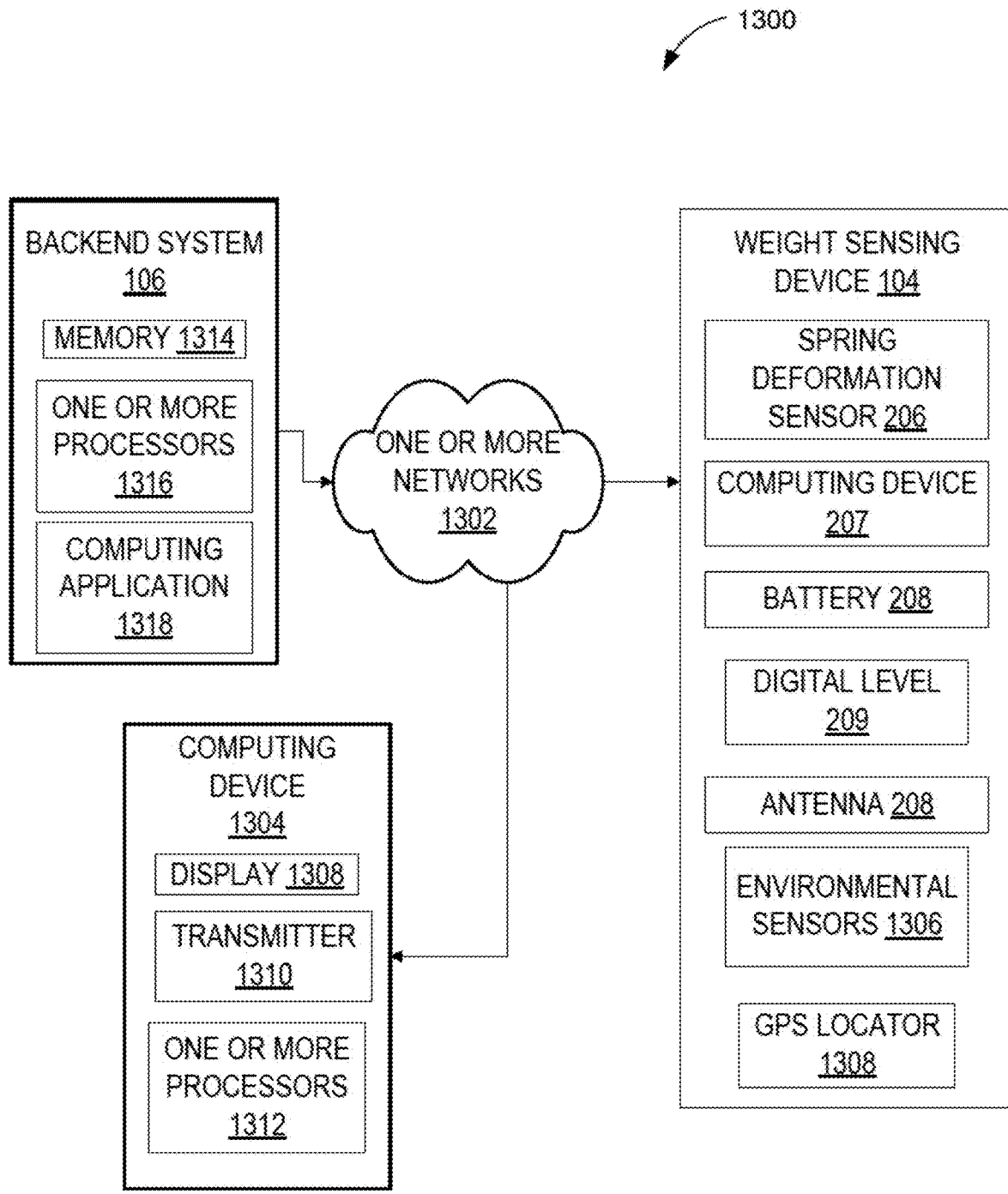
FIG. 13 illustrates an exemplary system architecture of the indirect weight sensing system, according to one embodiment of the present disclosure.

FIG. 13 shows an exemplary system architecture 1300 of the indirect weight sensing system, according to one embodiment of the present disclosure, according to one embodiment of the present disclosure. In multiple embodiments, the system 1300 may include one or more networks 1302, a weight sensing device 104 (can also be a weight sensing platform 901 or a bar apparatus 1000 and the associated components as described above), a computing device 1304, and a backend system 106.

In various embodiments, the weight sensing device 104 may include a spring deformation sensor 206, a computing unit 207, a battery 208, a digital level 209, an antenna 210, environmental sensors 1306, a GPS locator 1308, and/or other sensors and components. In one or more embodiments, as described herein, the spring deformation sensor 206 may measure the deformation of the springs 203 and transmit the spring deformation measurement to the computing unit 207. In at least one embodiment, the spring deformation sensor 206 may also associate a timestamp that corresponds to the date and time the spring deformation sensor 206 measured a particular spring deformation measurement, and transmit the timestamp along with the spring deformation measurement, or the computing unit 207 may record and associate the timestamp at which the computing unit 207 received a particular spring deformation measurement from the spring deformation sensor.

In several embodiments, the weight sensing device may also include the digital level 209. In many embodiments, the digital level 209 may calculate the angle of the weight sensing device 104. In one or more embodiments, the system may also include a gyroscope and/or an accelerometer. In some embodiments, the gyroscope and/or accelerometer may measure the angle of the weight sensing device 104 relative to the ground, which the digital level 209 may utilize in determining the angle of container relative to ground (e.g., the angle of inclination). In at least one embodiment, the digital level 209 may transmit the angle of inclination measurement (e.g., angular data) to the computing unit 207.

In one or more embodiments, the accelerometer may measure the magnitude of the impact load on the container 102. For example, in one embodiment, a container 102 may experience an impact load when the container 102 is dropped off a hauling vehicle at a job site (e.g., the impact load when the container hits the ground). In many embodiments, the container 102 may also experience dynamic impact loads when a load 103 is thrown into the container 102 (e.g., the load 103 dropping into the container causes an impact load upon contact with the container or other material already inside the container). In some embodiments, the impact of a load hitting the container 102, or the impact of the container 102 dropping onto the ground, or other similar situations, may cause the springs 203 to temporarily dynamically deform to a lower height before rebounding to a height that represents the weight of the load 103 in the container 102 as computed by the backend system 106. Stated differently, if the backend system 106 used the height of the springs 203 at the lower height when the springs 203 were temporarily dynamically deformed as the sensor data for computing the weight of the load 103, the computed weight of the load 103 likely would be larger than the actual weight of the load 103. In one or more embodiments, the accelerometer may transmit the accelerometer data to the computing unit 207, which the computing unit 207 may associate with corresponding spring deformation measurements based on timestamps of the measurements. In certain embodiments, the accelerometer may measure the impact load on the container, and if the accelerometer experiences an impact/sudden change that is representative of a dynamic loading event (e.g., the magnitude of the impact load is higher than a predetermined measurement), then the computing unit 207 or backend system 106 may discard or filter out the corresponding spring deformation measurement and other sensor data. In many embodiments, the computing unit 207 may only package sensor data that the computing unit 207 receives once the springs 203 have rebounded from the dynamic loading event (e.g., the load 103 is settled inside the container 102). In one embodiment, the accelerometer may sense the impact of a load 103 put into the container 102, which may trigger the computing unit 207 to wake up and collect sensor data or poll for sensor data from the spring deformation sensor 206, environmental sensors, digital level 209, accelerometer, and/or other components and sensors.

In many embodiments, the computing unit 207 may receive angular data from the digital level 209 or any other sensors at regular time intervals (e.g., every 5 minutes), or the computing unit 207 may transmit a signal to the digital level 209 to cause the digital level 209 to transmit the angular data when the computing unit 207 receives a spring deformation measurement from the spring deformation sensor 206. In one embodiment, the digital level 209 may only transmit angular data to the computing unit 207 when the angular data changes (e.g., if the container 102 is moved, if a load 103 causes the angle of the container relative to the ground to change, etc.).

In multiple embodiments, the computing unit 207 may be a passive unit, meaning that the computing unit 207 may not be constantly receiving measurements from the sensors and/or transmitting or receiving data to and from the backend system 106. In one or more embodiments, the computing unit 207 may utilize a wake up ping from the accelerometer or other components/sensors (e.g., spring deformation sensor) to wake up the computing unit 207 and collect sensor data or poll for sensor data from the spring deformation sensor 206, environmental sensors, digital level 209, accelerometer, and/or other components and sensors.

In various embodiments, the weight sensing device 104 may also include one or more environmental sensors 1306 for measuring environmental data. In some embodiments, the environmental data be may be a temperature and/or humidity at the location of the container 102 or within a housing of a sensing device 104, three-dimensional object location data (e.g., the distance an object is away from the environmental sensor 1306 and/or the shape of the object), and/or material and volumetric data inside the container 102 (e.g., a three-dimensional camera may extend from the weight sensing device 104 so that the three-dimensional camera can view and transmit images of the inside of the container 102). In one embodiment, the three-dimensional camera may transmit images to the backend system 106 (via the computing unit 207) for processing, which may determine the material(s) of the load 103 inside the container 102 and the volumetric data of the container 102 (e.g., how filled the container 102 is). In many embodiment, the environmental sensors 1306 may transmit the environmental data to the computing unit 207. In one or more embodiments, the environmental sensors 1306 may include, but are not limited to, temperature sensors, humidity sensors, LIDAR sensors, three-dimensional cameras, and/or other similar sensors.

In several embodiments, the computing unit 207 may be communicably connected to the sensors and components of the weight sensing device 104. In one or more embodiments, the computing unit 207 may communicate with the sensors and components via wireless and/or wired connections. In at least one embodiment, the wireless connections may include Bluetooth, near field communications, cellular, or other similar wireless communication systems. In some embodiments, the computing unit 207 receives sensor data (e.g., spring deformation measurement, angular data, accelerometer data, environmental data, and/or other data) from the sensors and components via a wired connection (or mix of wired or wireless communication mechanisms).

In various embodiments, upon receiving the sensor data from the components and sensors, the computing unit 207 may package a particular spring deformation measurement, the corresponding timestamp for the particular spring deformation measurement, the angular data, the accelerometer data, the environmental data, and/or other sensor data into a data package for transmittal to the backend system 106. In some embodiments, the computing unit 207 may only receive and package the spring deformation measurement, the angular data, and/or the environmental data, and transmit the data package to the backend system 106, and the backend system 106 may record the timestamp the backend system 106 receives the data package. In at least one embodiment, the computing unit 207 may also associate an identifier with each data package that the computing unit 207 produces. In one embodiment, the identifier identifies a particular weight sensing device to the backend system 106 so that the backend system 106 can match the associated sensor data to the pre-stored sensor data for the same type of spring as the spring included in the particular weight sensing device.

In multiple embodiments, the computing unit 207 may format the sensor data and other data in the data package prior to transmitting the data package to the backend system 106. In one embodiment, the data format of the data package may be a comma separated text file, but may also include other formats. In one or more embodiments, the computing unit 207 may associate each of the spring deformation measurement, the angular data, the accelerometer data, the environmental data, and/or other sensor data to each other by the timestamp associated with each of the measurements. In at least one embodiment, the computing unit 207 may package a plurality of individual data packages together into a large data package before transmitting the large data package to the backend system 106 to lower the amount of times the computing unit 207 transmits to the backend system 106, which may allow the battery to last longer.

In several embodiments, the weight sensing device 104 may also include a battery 208. In one or more embodiments, the battery 208 may be rechargeable or disposable. In at least one embodiment, the battery 208 may be removable from the weight sensing device 104 to recharge the battery 208, or to be replaced with another battery 208. In some embodiments, the battery 208 provides electrical power to the spring deformation sensor 206, the computing unit 207, digital level 209, the antenna 210, the environmental sensors, and other sensors and components.

In multiple embodiments, the weight sensing device 104 may also include an antenna/radio 210. In many embodiments, the antenna 210 may transmit a data package from the computing unit 207 to the backend system 106 or computing device 1304, via the one or more networks 1302. In at least one embodiment, the antenna 210 may transmit via Bluetooth radio (e.g., Bluetooth low energy (BLE)), near-field communication (NFC), cellular networks (e.g., 3G, 4G, 5G, long range spread spectrum modulation (LoRa), etc.), and other similar wireless communication tools. In some embodiments, the computing unit 207 may receive communications from the backend system 106 (via the one or more networks 1302 and the antenna 210). In certain embodiments, the communications may include a command to transmit a data package for the current sensor data, a command to calibrate one or more of the sensors and components (e.g., zeroing the components and sensors when the container is empty), a command that changes the spring identifier that the computing unit 207 associates with each data package (e.g., if the spring 203 is replaced in a weight sensing device), and/or other communications.

In one or more embodiments, the weight sensing device 104 may also include a GPS locator 1308. In at least one embodiment, the system 1300 may utilize the GPS locator 1308 to determine the location of the weight sensing device 104. In at least one embodiment, the backend system 106 or computing device 1304 may receive the location of the weight sensing device 104 from a GPS satellite or a system that includes a GPS satellite that can locate the GPS locator 1308 on the weight sensing device 104. In one embodiment, the backend system 106 may associate the location of the weight sensing device 104 with the computed weight of the container 102 calculated from the sensor data from the weight sensing device 104, and transmit the location of the weight sensing device 104 to the computing device 1304. In at least one embodiment, the GPS locator is included within a weight sensing device 104 and is communicably connected to the computing device 207 such that the GPS locator transmits a location of the GPS locator to the computing device 207 for inclusion in a data package to be sent to the backend system 106. In certain embodiments, the location of the weight sensing device 104 may be triangulated using cell phone towers instead of or in addition to utilizing a GPS locator.

In various embodiments, the backend system 106 may include memory 1314, one or more processors 1316, and a computer application 1318. In one embodiment, the backend system 106 may be a cloud server, a computer operating system, a software application, or a similar computing system.

In at least one embodiment, the memory 1314 may include a storage database. In some embodiments, the memory 1314 may store the spring deformation measurements, along with associated time stamps, and other associated data (e.g., environmental data, angular data, location information identifier, accelerometer data, etc.), for the container 102/weight sensing device 104. In many embodiments, the memory 1314 may also store associated user information, such as, but not limited to, user name, address, contact information, hauler information, etc. In one or more embodiments, the backend system 106 may retrieve the spring deformation measurements, associated time stamps, and other associated data from the memory 1314 to use as a training set for a machine learning algorithm or other uses. In some embodiments, the memory 1314 may store all previous spring deformation measurements and other data within the data packages associated with a particular spring identifier for a container 102. For example, in one embodiment, the memory 1314 may store each data package received from a computing unit 107 on a particular weight sensing device 107 and associated spring identifier so that the computer application 1318 may pull historical data for the particular weight sensing device 107 when computing the weight of the container 102 on the particular weight sensing device 107.

In multiple embodiments, the storage database may also include a plurality of pre-stored (e.g., predetermined) spring deformation characteristics for each type of spring 203 that may be utilized on a weight sensing device 104 under a plurality of conditions, and a plurality of spring deformation values associated with the predetermined spring deformation characteristics. In some embodiments, the plurality of conditions may include, but is not limited to, a duration of time between compressions/deformations, an amount of time between a time when the computed weight of the load 103 is equal to zero and a current time, a number of changes in the computed weight of the load 103, a plurality of temperatures associated with the type of spring 203, a plurality of humidity percentages associated with the type of spring 203, and/or other conditions.

In multiple embodiments, each of the plurality of deformation values may be associated with a known weight value. In one or more embodiments, the predetermined characteristics may be captured when testing types of springs to use in the weight sensing device 104 or may be based on historical data or both. In at least one embodiment, when testing a spring (such as the testing discussed in reference to FIG. 12), the spring 203 may be tested to find a deformation value based on the known plurality of conditions and known weight on the spring 203. For example, in one embodiment, a test may be performed on a particular type of spring, and the values of the plurality of conditions may be known, and the weight on the spring may be 800 lbs. In this example, in many embodiments, the resulting deformation value of 1.8 centimeters may be input, along with the other known inputs (e.g., plurality of conditions and weight of 800 lbs.), into the memory 1314 for characterization of future received deformation values.

In several embodiments, the one or more processors 1316 may (indirectly) determine the weight of the container 102 at a particular time from the spring deformation measurement, environmental data, and angular data measured at the particular time. In some embodiments, the one or more processors 1316 may receive a data package (including a received spring deformation value, a spring type, and other data in the data package) from the computing unit 207 for a container 102 loaded with material, compute one or more values for a plurality of conditions based on the received spring deformation value for the particular spring type, and characterize the spring deformation value as one of the predetermined spring deformation values for the particular spring type. In at least one embodiment, the predetermined spring deformation values are associated with weight values. In one embodiment, when the one or more processors 1316 characterizes the received deformation value as one of the predetermined deformation values, the one or more processors associates the known weight value associated with the predetermined deformation value to the received deformation value. In certain embodiments, once the one or more processors 1316 associates the weight value with the received deformation value, the one or more processors may calculate the actual weight of the load of material in the container based on, at least in part, the associated weight value and the angle of inclination.

In at least one embodiment, the computer application 1318 may receive or pull predetermined or premeasured characteristics for a type of spring under a plurality of conditions from the memory 1314 based at least in part on an identifier stored in memory and associated with the type of spring or a particular spring (e.g., the computer application may receive an identifier in a data package from a weight sensing device for retrieving characteristics associated a type of spring or a particular spring). In some embodiments, the one or more processors 1316 may compare the measured spring deformation measurements, environmental data, angular data, and other data in the received data package from a particular time for the same type of spring to the predetermined measurements, to determine the weight of the container 102 at the particular time.

In various embodiments, when the backend system 106 receives the data package from the computing unit 207, the one or more processors 1316 may compute one or more values based on the sensor data within the data package for the type of spring 203. In at least one embodiment, the one or more computed values may include a duration of time between compressions/deformations, an amount of time between a time when the computed weight of the load 103 is equal to zero and a current time, and a number of changes in the computed weight of the load 103.

In several embodiments, the one or more processors 1316 may compute the duration of time between compressions/deformations by calculating the time between receiving a current spring deformation value and receiving a previously received spring deformation value. In at least one embodiment, the current spring deformation value and the previously received spring deformation value may be different values, indicating that more material has been placed in the container 102 since the previously received spring deformation value was received by the backend system 106. In certain embodiments, the current spring deformation value and the previously received spring deformation value may be the same or approximately the same (e.g., a computing unit 207 received a command from the backend system 106 or device 1304 to collect sensor data or poll the sensors and components for sensor data, but no material had been placed in the container 102 since the previously transmitted data package that contained the previously received spring deformation value). In this embodiment, the one or more processors 1316 may utilize a previously computed duration of time between compressions calculated for the previously received data package as the computed value for the current spring deformation value. In one or more embodiments, the one or more processors 1316 may compute the time difference by calculating the time difference of the timestamp associated with the current deformation value and the timestamp associated with the previously received deformation value. For example, in one embodiment, the backend system 106 may have previously received a data package from a particular computing unit at 1:00 PM that contained a spring deformation value of 1.2 centimeters (e.g., the previously received spring deformation value) and the backend system 106 may have next received a data package from the particular computing unit at 1:15 PM that contains a spring deformation value of 1.6 centimeters (e.g., the current spring deformation value). Continuing with this example, in many embodiments, the one or more processors may compute the duration of time between compressions/deformations to be fifteen minutes. In at least one embodiment, once the one or more processors 1316 compute the duration of time between compressions/deformations, the one or more processors 1316 may characterize the received spring deformation value as one of the plurality of spring deformation values stored in the memory 1314 based on the duration of time between compressions for the type of spring 203. In at least one embodiment, the one or more processors stores the duration of time between compressions deformations in memory.

In various embodiments, the one or more processors 1316 may also compute an amount of time between a time when the computed weight of the load 103 of a particular container 102 is equal to zero and a current time (e.g., the amount of time since the particular container 102 was last empty), and/or the amount of time between a time of a previously known computed weight of the load 103 of the particular container 102 and the current time (e.g., the amount of time since the previous load 103 was placed into the container 102). In one embodiment, the current time may be the timestamp associated with the current deformation value. In one or more embodiments, the computer application 1318 may pull or receive historical data from the memory 1314 regarding a previous time the sensor deformation value for the particular container was zero. In some embodiments, an empty container 102 may still cause the springs 203 to deform, and in this case, the one or more processors may compute an amount of time between a time when the computed weight of the load 103 of a particular container 102 is equal to a sensor deformation value associated with the weight of an empty container 102 and a current time.

For example, in one embodiment, a particular container may be emptied at 10:00 AM (and have the associated data package sent to the backend system 106 and stored in the memory 1314) and may thereafter be loaded with material through the day. Continuing with this embodiment, in at least one embodiment, the backend system may receive a data package from a computing unit in contact with the particular container at 4:00 PM that includes the current deformation value. Still continuing with this example, in certain embodiments, the one or more processors may compute the amount of time between the time when the computed weight of the load 103 of the particular container was zero and the current time to be six hours by pulling the last time the container weight was zero and calculating the difference between that time and the current time. In one embodiment, the one or more processors 1316 may characterize the received deformation value in the current data package as one of the plurality of deformation values stored in memory based on the amount of time between a time when the computed weight of the load of material is equal to zero and the current time.

In multiple embodiments, the one or more processors 1316 may also compute a number of changes in the computed weight of the load 103 in the container 102 (e.g., how many times the computed weight of the load 103 has changed). In at least one embodiment, the computer application 1318 may pull or receive from the memory 1314 each instance the computed weight for a container 102 changed since the last time the computed weight of the container 102 was zero, or may pull or receive from the memory 1314 each instance the computed weight for a container 102 has changed since the last time the spring 203 was replaced. In one or more embodiments, the one or more processors 1316 may count the number of instances of changes in the computed weight of the load 103 in the container 102. In one embodiment, the one or more processors 1316 may characterize the received/current deformation value as one of the plurality of deformation values stored in memory based on the number of changes in the computed weight of the load of material in the container 102.

In various embodiments, once the one or more processors 1316 have characterized the received (e.g., current) deformation value based on one or more of the plurality of conditions (e.g., duration of time between compressions, time since the container weight was zero, number of compressions, temperature and humidity data), the one or more processors 1316 may compute a weight for the load of the material based on characterizing the received deformation value as one of the plurality of deformation values stored in the memory.

For example, in one embodiment, for a particular received data package from the computing unit 207 (including a particular received deformation value) and a particular spring type (and/or identifier), the one or more processors may compute that, for the particular received deformation value, the duration of time between compressions is 30 minutes, the time since the container weight was zero is 45 hours, the number of compressions is 25, and the temperature is 75 degrees Fahrenheit and the humidity is 30% (temperature and humidity values received in the data package). Continuing with the example, in many embodiments, the one or more processors 1316 may compare the computed plurality of conditions for the particular received deformation value (e.g., 3 centimeters) for the particular spring type to the predetermined characteristics of the particular spring under a plurality of conditions stored in the memory 1314. In certain embodiments, the predetermined characteristics of the particular spring under a plurality of conditions may be associated with a plurality of deformation values stored in the memory 1314. In at least one embodiment, the one or more processors 1316 may compute a weight value of the load of material based on the characterization (comparison) of the received deformation value as one of the plurality of deformation values stored in the memory 1314. For example, in one or more embodiments, after computing the one or more of the plurality of conditions for a particular received deformation value, the one or more processors 1316 may characterize the particular received deformation value of 3 centimeters for a particular spring type as a stored deformation value of 2.9, 3.0, or 3.1 centimeters associated with similar conditions, for which a weight of 1200 lbs. is associated. In this example, the system computes a weight of 1200 lbs. for the particular received deformation value of 3.

In multiple embodiments, the one or more processors 1316 may compute the weight of the load of material based on the computed weight value for the load of material and the angle of inclination of the container 102. In at least one embodiment, the angle of inclination may be utilized to determine an effective center of mass location of the loaded container 102. In some embodiments, the effective center of mass location of the loaded container 102 may be utilized, along with the weight value of the load of material in a moment calculation to determine the actual weight of the load of material.

For example, in several embodiments, if a container 102 is on a hill and the weight sensing device 104 is on the downhill side of the container 102, the effective center of mass location of the container and materials would be closer to the device 104 than if the container 102 was on level ground. Continuing with the example, in one embodiment, the sensor deformation measurement and associated weight value (after the characterizations are determined) may have larger values than would be calculated if the container was on level ground. In at least one embodiment, the moment calculation (utilizing the effective center of mass location and weight value of the material and container) may determine the actual weight of the loaded container 102.

In various embodiments, the one or more processors 1314 may utilize the known predetermined characteristics for a type of spring (e.g., known from testing the type of spring under a plurality of conditions) to extrapolate predetermined characteristics for the particular type of spring so that the characterization of the received deformation value of a particular type of spring may match the predetermined characteristics of the particular spring stored in the memory 1314.

In one or more embodiments, once the computer application 1318 and/or one or more processors 1316 have calculated the actual weight of the particular container 102, the computer application 1318 and/or one or more processors 1316 may compare the calculated actual weight to a maximum weight limit for the container 102. In certain embodiments, if the calculated weight for the particular container 102 is over or within a certain percentage of the maximum weight limit for the container 102 (e.g., overweight, 95%, 90%, 80%, etc.), the computer application 1318 may transmit or otherwise cause a notification to be sent to the computing device 1306 of the container hauler and/or the user to inform that the weight limit of the container 102 is or is almost reached, and for the container hauler to pick up the container 102. For example, in one embodiment, the maximum weight limit of the container 102 may be 2000 lbs., and the calculated weight of the container 102 may be 1750 lbs., and the computer application 1318 may determine that the range to notify the container hauler and user that the container 102 is almost at the weight limit is 85% of the weight limit, or 300 lbs. Continuing with this example, in many embodiments, the computer application 1318 may determine that the container is 87.5% full (1750 lbs./2000 lbs.) and notify the user and container hauler (via email, text message, push notifications, etc.) that the container hauler should retrieve the container 102 and that the user should stop loading the container 102.

In various embodiments, the computing device 1304 may be a personal computer, mobile device, tablet, smart watch, laptop, web application, or similar devices. In at least one embodiment, the computing device 1304 may include a display 1308, a transmitter 1310, and one or more processors 1312.

In many embodiments, the display 1308 display the weight of the container 102, the location of the weight sensing device 104, historical weight information (e.g., previous weights and corresponding timestamps) for the particular weight sensing device 104/container 102, environmental data, how full the container 102 is (e.g., a percentage determined by the current weight of the container divided by a maximum container weight), user information (e.g., name, address, time user has had container 102, etc.), container hauler information, container history (e.g., how many times the container 102 has been rented, maximum weights of the container 102, etc.) and/or other data related thereto. In at least one embodiment, the display 1308 may be different depending on the end user of the system 1300. For example, in one embodiment, the display 1308 for a container hauler (e.g., a person or entity that owns one or more containers 102 and allows users to rent those containers 102) may display the location and information for each container 102 the container hauler owns. Continuing with the example, in some embodiments, the display 1308 for individual users (e.g., a user that rents a container 102 for use) may only display the location and information for the container 102 the user is using. In one or more embodiments, the display 1308 may also display the battery life of the battery 208 and/or signal strength of the antenna 210.

In multiple embodiments, the computing device 1304 may receive, via network communications (e.g., cellular), the spring deformation measurement and other associated data for the container 102, from the computing unit 207 or the backend system 106, via the one or more networks 1302. In at least one embodiment, the transmitter 1310 may transmit via Bluetooth radio, NFC, cellular, and other similar wireless communication tools. In one embodiment, the transmitter 1310 may further transmit the spring deformation value and associated data to the backend server 106 for processing.

Figure 14:
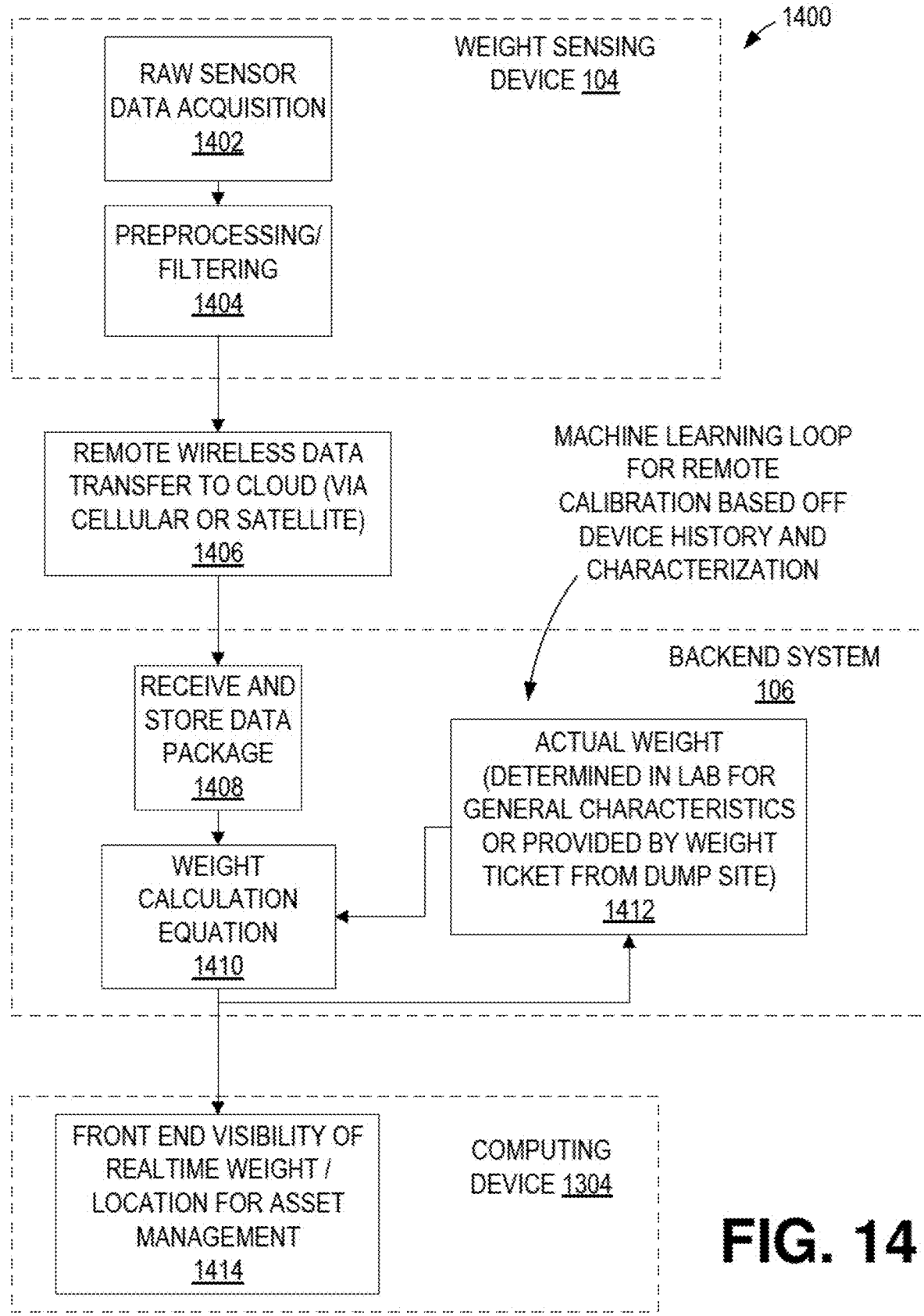
FIG. 14 is a flow chart of an exemplary indirect weight sensing process, according to one embodiment of the present disclosure.

FIG. 14 shows a flow chart 1400 of an exemplary indirect weight sensing process, according to one embodiment of the present disclosure. In various embodiments, prior to step 1402, one or more of the weight sensing devices 104, platform 901, and/or bar apparatus 1000 may be placed underneath a container 102 for calculating the weight of the loaded container 102. In one or more embodiments, the memory 1314 may be loaded with the predetermined characteristics of a particular spring type.

At step 1402, in several embodiments, the computing unit 207 on the weight sensing device 104, platform 901, and/or bar apparatus 1000 may acquire or receive raw sensor data (e.g., measure the spring deformation (via the spring deformation sensors), the environmental data (via the environmental sensors), the angular data (via the digital level, accelerometer data, and/or other data) to calculate the weight of the loaded container 102. In one or more embodiments, the raw sensor data may be transmitted from the various sensors to the computing unit 207.

At step 1404, in multiple embodiments, the computing unit 207 preprocess/filters the raw sensor data. In at least one embodiment, the raw sensor data may be electrical currents from the various sensors, and the computing unit 207 may process those electrical currents into the numerical data for each of the spring deformation measurement, the environmental data, the angular data, the accelerometer data, and/or other data. In certain embodiments, the spring deformation sensor 206 may process the deformation measurement prior to sending the data to the computing unit 207. For example, in one embodiment, the spring deformation sensor 206 may digitize the electrical currents into a numerical value prior to transmitting the data to the computing unit 207. In some embodiments, the computing unit 207 may associate each of the spring deformation measurement, the environmental data, the angular data, the accelerometer data, and/or other data together by a timestamp and package the associated data together in a data package. In one or more embodiments, the spring deformation measurement may include a large dynamic spring deformation (e.g., a dynamic loading event), and the computing unit 207 or the backend system 106 may filter the resulting measurement from the large dynamic spring deformation so that the computing device 1318 does not use the resulting measurement in the weight calculation.

At step 1406, in various embodiments, the computing unit 207, via the antenna 210, may wirelessly and remotely transmit the filtered, preprocessed sensor data to the cloud/backend system 106. In certain embodiments, the computing unit 207 may skip step 1406 and transmit the raw sensor data to the backend system 106.

At step 1408, in one or more embodiments, the backend system 106 may receive the data package from the weight sensing device 106 and store the data package in the memory 1314 (including the spring identifier).

At step 1410, in many embodiments, the computing application 1318 may calculate the weight of the container 102 from a weight calculation computation. In at least one embodiment, the inputs to the weight calculation computation may be, but are not limited to, the spring deformation measurement, the duration of time between the last time the springs 203 were deformed and the current time, the amount of time the load 103 has been on the springs 203, the number of times the springs 203 have been compressed, the temperature and/or humidity, and/or other data. In one or more embodiments, the computing application 1318 may compare the spring characteristics and measurements from the received data package to the pre-stored spring characteristics for the same type of spring with associated known weights, to determine the weight of the container 102.

At step 1412, in several embodiments, the computing application 1318 may include a machine learning loop for remote calibration of a weight sensing device 104 based off of the device 104 history and characterization. In at least one embodiment, once the computed weight of the container 102 is determined by the computing application 1318, the computed weight and associated characteristics may be stored in the memory 1314 as predetermined characteristics for the type of spring 203 for the next weight computation.

At step 1414, in multiple embodiments, the cloud/backend system 106 may transmit the weight data to the computing device 1304. In one or more embodiments, the display 1308 may be the front end visibility of the real-time weight of the container 12 and the location of the weight sensing device 104 for asset management.

Figure 15:
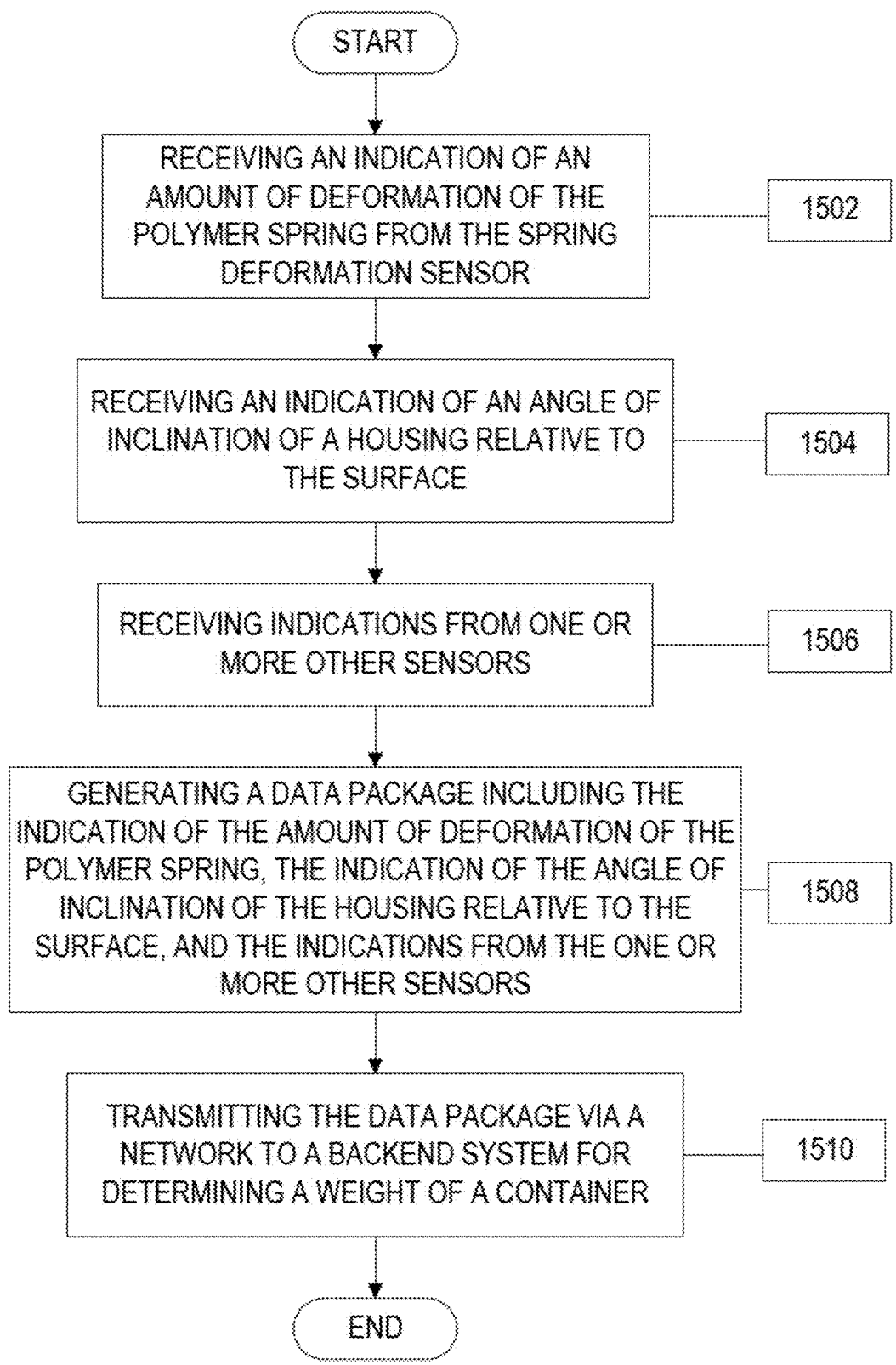
FIG. 15 is a flow chart of an exemplary indirect weight sensing process, according to one embodiment of the present disclosure.

FIG. 15 shows a flow chart of an exemplary indirect weight sensing process, according to one embodiment of the present disclosure. In various embodiments, at step 1502, the computing unit 207 may receive an indication of an amount of deformation of the spring 203 from the spring deformation sensor 206. In at least one embodiment, the spring 203 may be deformed when a load 103 is put inside a container 102. In one or more embodiments, the spring deformation sensor may measure the height, volume, or other difference in the springs 203 before and after the load 103 is put in the container 102, or may measure the angle of the upper plate 201 relative to the lower plate 211 (or vice versa) before and after the load 103 is placed into the container 102 to calculate the spring deformation distance.

As seen in step 1504, in some embodiments, the weight sensing device 104 may receive an indication of an angle of inclination (e.g., angular data) of a housing relative to the surface. In one or more embodiments, the digital level 209 may measure the angle of inclination and transmit the indication of the angle of inclination to the computing unit 207 on the weight sensing device 104.

As described in step 1506, in many embodiments, the weight sensing device 104 may receive indications from one or more other sensors. In at least one embodiment, the one or more other sensors may include environmental sensors, such as temperature sensors, humidity sensors, LIDAR sensors, three-dimensional cameras, and other similar sensors, and the indications from one or more other sensors may be the environmental data received from the environmental sensors.

As described in step 1508, in one or more embodiments, the weight sensing device 104, via the computing unit 207, may generate a data package including the indication of the amount of deformation of the polymer spring, the indication of the angle of inclination of the housing relative to the surface, and the indications from the one or more other sensors.

As described in step 1510, in multiple embodiments, once the weight sensing device 104 has generated the data package, the weight sensing device 104 may transmit the data package via a network (e.g., one or more networks 1302) to a backend system 106 (e.g., backend system 106) for determining/computing a weight of a container (as described in further detail in the description of FIG. 13).

Figure 16:
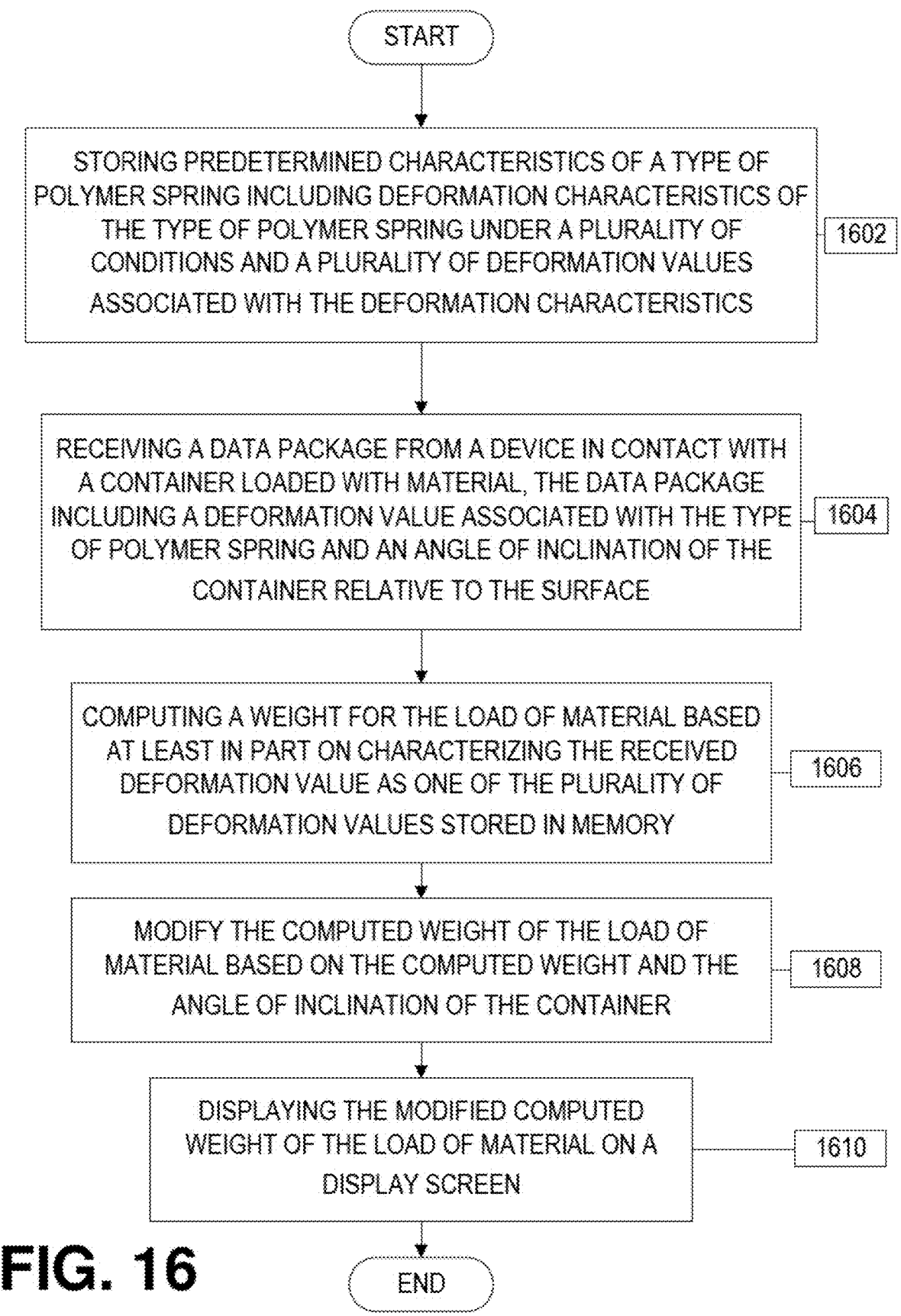
FIG. 16 is a flow chart of an exemplary indirect weight sensing process, according to one embodiment of the present disclosure.

As shown in FIG. 16, a flow chart of an exemplary indirect weight sensing process is described, according to one embodiment of the present disclosure. In various embodiments, in step 1602, the backend system 106 may store predetermined characteristics of a type of spring 203, the predetermined characteristics including deformation characteristics of the type of polymer spring under a plurality of conditions and a plurality of deformation values associated with the deformation characteristics. In one or more embodiments, the predetermined characteristics of a type of spring 203 may be created by testing the type of spring 203 in a variety of deformation tests. For example, in one embodiment, a test to find deformation characteristics for type of spring 203 may be to deform the spring 203 with a certain force and at a certain temperature and humidity level, and determining the spring deformation under these certain conditions. In at least one embodiment, the predetermined characteristics may be stored in the memory 1314 of the backend system 106.

In multiple embodiments, in step 1604, the backend system 106 may receive a data package from a weight sensing device 104 in contact with a container 102 (e.g., loaded with material), the data package including a deformation value (e.g., a spring deformation measurement) associated with the type of spring 203 and an angle of inclination (e.g., angular data from the digital level) of the container 102 relative to the surface. For example, in one embodiment, the backend system 106 may receive a data package from the weight sensing device 104 (via the computing unit 207 and antenna 210) that includes a deformation value (e.g., spring deformation measurement) of one centimeter (1 cm), an angle of inclination of five degrees (5 degree angle), an identifier associated with the weight sensing device 104, and/or environmental data, and a timestamp (or the backend system 106 may associate a timestamp with the data package upon receiving the data package).

In at least one embodiment, at step 1606, the backend system 106 may compute a weight for the load of material (e.g., the load 103) based at least in part on characterizing the received deformation value as one of the plurality of predetermined deformation values stored in memory 1314. For example, in certain embodiments, deformation value may be one centimeter for a particular type of spring 203, and the backend system 106 may compare the deformation value against the predetermined deformation values for the particular type of spring 203 to compute the weight value of the load 103 to be 200 pounds.

In various embodiments, at step 1608, the backend system 106 may modify the computed weight of the load of material (e.g., the load 103) based on the angle of inclination of the container 102. For example, in some embodiments, the computed weight for the load of material may be 200 pounds, and the angle of inclination may be five degrees, and the backend system 106 may compute the modified weight by inputting the computed weight and the angle of inclination into a weight calculation algorithm or a similar type of calculation (e.g., a moment calculation) to determine the modified weight (e.g., actual weight) of the load of material.

In several embodiments, at step 1610, the backend system 106 may cause the modified weight of the load of material to be displayed on a display screen. In at least one embodiment, the backend system 106 may transmit the modified weight of the load of material to the computing device 1304 to be displayed. In one or more embodiments, other data may be displayed, for example, user information, hauler information, historical weights for each container, time since a container was last loaded, time a user has had the container, the location of a container, and other similar data.

While materials for elements have been described, the device is not limited by these materials. Wood, plastics, rubber, foam, metal alloys, aluminum, and other materials may include some or all of the elements of the on-site weight sensing devices and apparatuses in various embodiments of the present aspect.

Although the present aspect has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed system and processes may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system and processes are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the system and processes are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system and processes is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed system and processes will be readily discernible from the description herein, by those of ordinary skill in the art. Many embodiments and adaptations of the disclosure and claimed system and processes other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed system and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed system and processes. In addition, some steps may be carried out simultaneously, contemporaneously, or in synchronization with other steps.

The embodiments were chosen and described in order to explain the principles of the claimed system and processes and their practical application so as to enable others skilled in the art to utilize the system and processes and various embodiments and with various modifications as are suited to the particular use contemplated. Alternative embodiments will become apparent to those skilled in the art to which the claimed system and processes pertain without departing from their spirit and scope. Accordingly, the scope of the claimed system and processes is defined by the appended claims rather than the foregoing description and the exemplary embodiments described therein.

What is claimed is:

1. An indirect weight measuring device comprising:
   a housing comprising a top plate and a bottom plate;
   a spring operatively connected to the top plate and bottom plate;
   a spring deformation sensor within the housing and configured for measuring an amount deformation of the spring;
   a digital level fixed to the top plate and configured for measuring an angle of inclination of the top plate; and
   a computing device comprising at least one processor, wherein the at least one processor is configured for:
   receiving an indication of the amount of deformation of the spring from the spring deformation sensor;
   receiving an indication of the angle of inclination of the top plate;
   generating a data package comprising the indication of the amount of deformation of the spring and the indication of the angle of inclination of the top plate; and
   transmitting the data package via a network to a back-end system for computing a weight of a container in contact with the housing based in least in part on:
   a weight determined by comparing the indication of the amount of deformation of the spring to pre-stored data associated with characteristics of the spring; and
   the angle of inclination of the top plate.

2. The indirect weight measuring device of claim 1, wherein the housing comprises a bar shape.

3. The indirect weight measuring device of claim 2, wherein the housing comprises a first area comprising metal components for contacting the container.

4. The indirect weight measuring device of claim 3, wherein the housing comprises a second area comprising plastic components and including the computing device for transmitting the data package through the plastic components.

5. The indirect weight measuring device of claim 1, wherein the housing is affixed to the container.

6. The indirect weight measuring device of claim 5, wherein the housing is bolted to the container.

7. The indirect weight measuring device of claim 5, wherein the housing is welded to the container.

8. The indirect weight measuring device of claim 1, wherein the housing further comprises at least one stand-off for preventing the spring from bottoming out.

9. The indirect weight measuring device of claim 1, wherein the spring deformation sensor comprises a strain gauge.

10. The indirect weight measuring device of claim 1, wherein the spring deformation sensor comprises a distance sensor or an angular sensor.

11. The indirect weight measuring device of claim 1, wherein the housing is weather-proof.

12. The indirect weight measuring device of claim 11, wherein the housing comprises one or more seals to prevent water from entering the housing.

13. The indirect weight measuring device of claim 1, wherein the housing comprises vibration dampening adhesive.

14. The indirect weight measuring device of claim 1, further comprising a temperature sensor within the housing and configured for measuring a temperature within the housing.

15. The indirect weight measuring device of claim 14, wherein:
the at least one processor is further configured for receiving an indication of the temperature within the housing from the temperature sensor;
the data package further comprises the indication of the temperature; and
the weight is determined by comparing the indication of the amount of deformation of the spring and the indication of temperature to pre-stored data associated with characteristics of the spring.

16. A system for indirectly computing a weight of a container comprising:
a device comprising:
a housing comprising a top plate and a bottom plate;
a spring operatively connected to the top plate and bottom plate;
a spring deformation sensor within the housing and configured for measuring an amount deformation of the spring; and
a digital level fixed to the top plate and configured for measuring an angle of inclination of the top plate;
a memory storing predetermined characteristics of a spring type of the spring, the predetermined characteristics comprising:
deformation characteristics of the spring type under a plurality of conditions; and
a plurality of deformation values associated with the deformation characteristics; and
at least one processor operatively connected to the memory, the at least one processor configured for:
receiving a data package from the device, wherein the device is in contact with a container loaded with material, the data package comprising:
a deformation value associated with the spring;
an angle of inclination of the container relative to a surface;
computing a weight for a load of material based at least in part on characterizing the received deformation value as one of the plurality of deformation values stored in memory;
modifying the weight of the load of material based on the computed weight for the load of material and the angle of inclination of the container; and
displaying the modified weight of the load of material on a display screen.

17. The system of claim 16, wherein the plurality of conditions include a duration of time between compressions.

18. The system of claim 17, wherein the received deformation value is different than a previously received deformation value for the load of material stored in memory.

19. The system of claim 18, wherein a first condition of the plurality of conditions comprises a duration of time between receiving different deformation values.

20. The system of claim 19, wherein:
the at least one processor is further configured for computing a duration of time between the receiving the deformation value and receiving the previously received deformation value; and
characterizing the received deformation value as one of the plurality of deformation values stored in memory is based on the duration of time.

21. The system of claim 20, wherein a second condition of the plurality of conditions comprises an amount of time between a time when the modified weight of the load of material is equal to zero and a current time.

22. The system of claim 21, wherein characterizing the received deformation value as one of the plurality of deformation values stored in memory is based on the amount of time.

23. The system of claim 22, wherein a third condition of the plurality of conditions comprises a number of changes in the modified weight of the load of material.

24. The system of claim 23, wherein characterizing the received deformation value as one of the plurality of deformation values stored in memory is based on the number of changes in the modified weight of the load of material.

25. The system of claim 24, wherein a forth condition of the plurality of conditions comprises a plurality of temperatures associated with the spring type.

26. The system of claim 25, wherein:
the data package further comprises a temperature value; and
characterizing the received deformation value as one of the plurality of deformation values stored in memory is based on the temperature value and the plurality of temperatures associated with the type of spring.

* * * * *